US010539353B2

(12) United States Patent
Umeda et al.

(10) Patent No.: US 10,539,353 B2
(45) Date of Patent: Jan. 21, 2020

(54) REFRIGERATING APPARATUS AND CONTROL DEVICE FOR REFRIGERATING MACHINE

(71) Applicant: Daikin Applied Americas Inc., Minneapolis, MN (US)

(72) Inventors: Nobuhiro Umeda, Fishersville, VA (US); Takatoshi Takigawa, St Louis Park, MN (US); Fumiaki Onodera, Minnetonka, MN (US); Nobutoshi Kozono, Osaka (JP)

(73) Assignee: DAIKIN APPLIED AMERICAS INC., Minneapolis, MN (US)

(*) Notice: Subject to any disclaimer, the term of this patent is extended or adjusted under 35 U.S.C. 154(b) by 646 days.

(21) Appl. No.: 14/211,530

(22) Filed: Mar. 14, 2014

(65) Prior Publication Data

US 2014/0260388 A1 Sep. 18, 2014

Related U.S. Application Data

(60) Provisional application No. 61/798,082, filed on Mar. 15, 2013.

(51) Int. Cl.
*F25B 49/02* (2006.01)
*F25B 1/053* (2006.01)
(Continued)

(52) U.S. Cl.
CPC ............ *F25B 49/022* (2013.01); *F25B 1/053* (2013.01); *F25B 41/043* (2013.01); *F25B 49/02* (2013.01);
(Continued)

(58) Field of Classification Search
CPC ............ F25B 49/022; F25B 2700/1931; F25B 2600/025; F05B 2270/1081; F04D 27/02; F04D 27/0292
See application file for complete search history.

(56) References Cited

U.S. PATENT DOCUMENTS 3,352,125 A * 11/1967 Beatenbough ........ F25B 41/062
251/321
3,962,607 A * 6/1976 Burns .................... H02H 3/093
330/207 P
(Continued)

FOREIGN PATENT DOCUMENTS

JP 62-195492 A 8/1987
JP 64-394 A 1/1989
(Continued)

OTHER PUBLICATIONS

Brasz, Comparison of Part-Load Efficiency Characteristics of Screw and Centrifugal Compressors, 2006, Purdue University Purdue e-Pubs.*
(Continued)

*Primary Examiner* — Nelson J Nieves
(74) *Attorney, Agent, or Firm* — Global IP Counselors, LLP

(57) ABSTRACT

A refrigerating apparatus includes a centrifugal compressor, suction and discharge capacity control mechanisms that control capacity of the compressor by changing opening degrees of the suction and discharge capacity control mechanisms, and a controller that compares a compressor-specific surge curve with an isentropic head to perform rotational speed control of the compressor, rotational speed adjustment control of the compressor in order to avoid surge, and emergency shutdown control of the compressor upon detection of surge. The compressor-specific surge curve is stored in the controller in advance, and is defined by an actual rotational speed of the compressor and opening degrees of the suction and discharge capacity control mechanisms. The isentropic head is calculated based on a suction pressure, a discharge pressure, and a suction temperature during operation.

4 Claims, 13 Drawing Sheets

(51) Int. Cl.
*F25B 41/04* (2006.01)
*F25B 1/10* (2006.01)
*F25B 25/00* (2006.01)

(52) U.S. Cl.
CPC .............. *F25B 1/10* (2013.01); *F25B 25/005* (2013.01); *F25B 2339/047* (2013.01); *F25B 2400/13* (2013.01); *F25B 2400/23* (2013.01); *F25B 2600/0253* (2013.01); *F25B 2600/2513* (2013.01); *F25B 2700/195* (2013.01); *F25B 2700/197* (2013.01); *F25B 2700/2109* (2013.01); *F25B 2700/21161* (2013.01); *F25B 2700/21162* (2013.01); *F25B 2700/21171* (2013.01); *Y02B 30/741* (2013.01)

(56) References Cited

U.S. PATENT DOCUMENTS

| | | | | |
|---|---|---|---|---|
| 4,594,051 A * | 6/1986 | Gaston | ............... | F04D 27/001 374/10 |
| 4,646,530 A * | 3/1987 | Huenniger | ......... | F04D 27/0253 62/175 |
| 5,203,179 A * | 4/1993 | Powell | ............... | F04D 27/0261 62/180 |
| 5,355,691 A | 10/1994 | Sullivan et al. | | |
| 5,845,509 A * | 12/1998 | Shaw | ................. | F04D 27/0261 417/5 |
| 5,894,736 A | 4/1999 | Beaverson et al. | | |
| 6,036,432 A | 3/2000 | Sishtla et al. | | |
| 6,558,113 B2 * | 5/2003 | Blotenberg | ......... | F04D 27/0207 415/118 |
| 6,578,373 B1 * | 6/2003 | Barbier | ................. | F25B 49/005 236/78 D |
| 7,313,465 B1 * | 12/2007 | O'Donnell | ............. | G06Q 50/06 323/237 |
| 2001/0022938 A1 * | 9/2001 | Blotenberg | ......... | F04D 27/0207 417/53 |
| 2004/0025523 A1 * | 2/2004 | Bodell, II | ............ | F04D 27/0253 62/228.1 |
| 2005/0144965 A1 | 7/2005 | Ueda et al. | | |
| 2010/0295700 A1 * | 11/2010 | Mauk | ................. | H01R 13/6456 340/9.1 |
| 2011/0093133 A1 | 4/2011 | Turney et al. | | |
| 2012/0048387 A1 * | 3/2012 | Galeotti | ................ | F04D 27/001 137/14 |
| 2013/0000339 A1 * | 1/2013 | Shimazu | ............... | F25B 31/004 62/192 |
| 2013/0319020 A1 * | 12/2013 | Neeld | ................... | F25D 11/003 62/89 |
| 2014/0041401 A1 * | 2/2014 | Douglas | ................. | F25B 43/00 62/89 |
| 2014/0092655 A1 * | 4/2014 | Igarashi | ................. | B60L 3/003 363/56.03 |
| 2014/0316675 A1 * | 10/2014 | Buckland | ................ | F02B 37/12 701/103 |
| 2015/0219110 A1 * | 8/2015 | De | ...................... | F04D 27/0246 415/1 |
| 2015/0314670 A1 * | 11/2015 | Lucht | ....................... | B60P 3/20 62/115 |

FOREIGN PATENT DOCUMENTS

| | | |
|---|---|---|
| JP | 2003-314489 A | 11/2003 |
| JP | 2005-180267 A | 7/2005 |
| JP | 2009-186031 A | 8/2009 |

OTHER PUBLICATIONS

Absolute Pressure, Engineering Toolbox.*
Altitude Pressure, Engineering Toolbox.*
Darcy-Weisbach Formula.*
Compressor Calculation: Rigorous Using Equation of State vs Shortcut Methos, 2011.*
Calculating Friction Loss Darcy-Weisbach Formula vs. Hazen-Williams, 2006.*

* cited by examiner

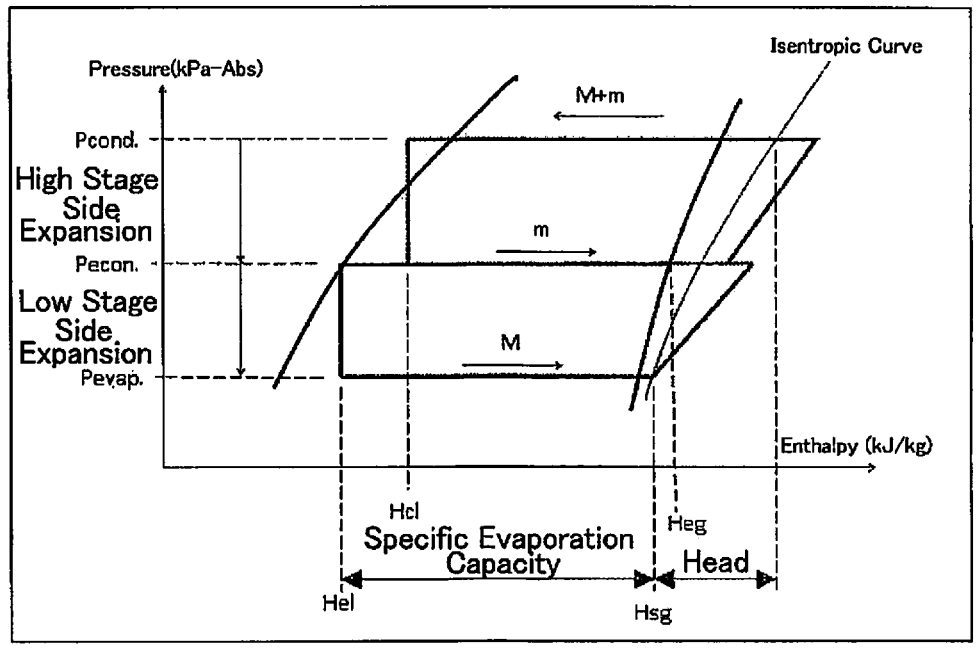
Figure 2A
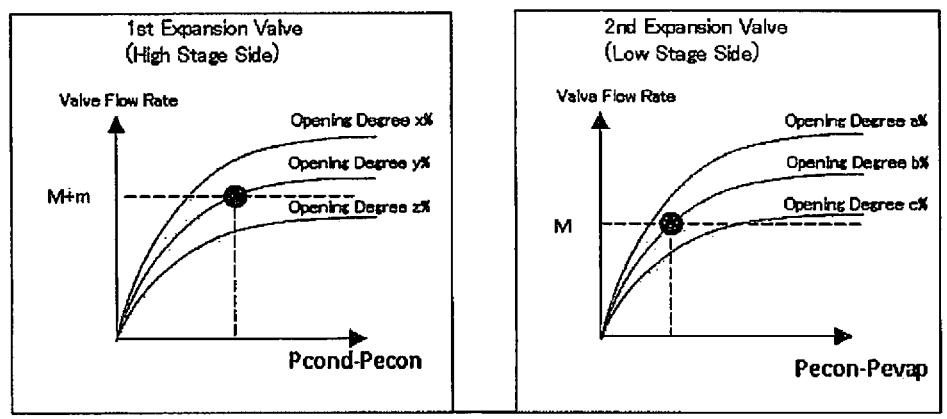
Figure 2B
Figure 2C

[図5B]

| Suction Sat degC | Pressure [MPaA] | Altitude = 0m Enthalpy Suction Temp. = 5 degC | Altitude = 2000m Deviation with respect to the standard head @altitude = 0m and Suction Temp. = 5 degC Suction Temp. | | | | | | | | | | | | | |
|---|---|---|---|---|---|---|---|---|---|---|---|---|---|---|---|---|
| | | | 5 | 10 | 15 | 20 | 25 | 30 | 35 | 40 | 45 | 50 | 55 | 60 | 65 | 70 | 75 |
| -10 | 0.2006 | 34.90 | -2.30 | -2.33 | -2.36 | -2.39 | -2.42 | -2.45 | -2.49 | -2.52 | -2.55 | -2.59 | -2.62 | -2.65 | -2.69 | -2.72 | -2.76 |
| -5 | 0.2433 | 29.85 | -1.74 | -1.76 | -1.79 | -1.81 | -1.83 | -1.86 | -1.88 | -1.91 | -1.93 | -1.96 | -1.98 | -2.01 | -2.04 | -2.06 | -2.09 |
| 0 | 0.2928 | 25.14 | -1.32 | -1.33 | -1.35 | -1.37 | -1.39 | -1.40 | -1.42 | -1.44 | -1.46 | -1.48 | -1.50 | -1.52 | -1.54 | -1.56 | -1.58 |
| 5 | 0.3497 | 20.75 | -0.99 | -1.00 | -1.01 | -1.03 | -1.04 | -1.05 | -1.07 | -1.08 | -1.09 | -1.11 | -1.12 | -1.14 | -1.15 | -1.17 | -1.18 |
| 10 | 0.4146 | | N/A | -0.74 | -0.75 | -0.76 | -0.77 | -0.78 | -0.79 | -0.80 | -0.81 | -0.82 | -0.83 | -0.84 | -0.85 | -0.86 | -0.87 |
| 15 | 0.4884 | | N/A | N/A | -0.54 | -0.55 | -0.55 | -0.56 | -0.57 | -0.57 | -0.58 | -0.59 | -0.59 | -0.60 | -0.61 | -0.62 | -0.63 |
| 20 | 0.5717 | | N/A | N/A | N/A | -0.38 | -0.38 | -0.39 | -0.39 | -0.39 | -0.40 | -0.40 | -0.41 | -0.41 | -0.42 | -0.43 | -0.43 |
| 25 | 0.6654 | | N/A | N/A | N/A | N/A | -0.24 | -0.25 | -0.25 | -0.25 | -0.25 | -0.26 | -0.26 | -0.26 | -0.27 | -0.27 | -0.27 |
| 30 | 0.7702 | | N/A | N/A | N/A | N/A | N/A | -0.13 | -0.13 | -0.14 | -0.14 | -0.14 | -0.14 | -0.14 | -0.14 | -0.15 | -0.15 |
| 35 | 0.8870 | | N/A | N/A | N/A | N/A | N/A | N/A | -0.04 | -0.04 | -0.04 | -0.04 | -0.04 | -0.04 | -0.04 | -0.04 | -0.04 |
| 40 | 1.0166 | | N/A | N/A | N/A | N/A | N/A | N/A | N/A | N/A | N/A | N/A | N/A | N/A | N/A | N/A | N/A |
| 45 | 1.1599 | | N/A | N/A | N/A | N/A | N/A | N/A | N/A | N/A | N/A | N/A | N/A | N/A | N/A | N/A | N/A |
| 50 | 1.3179 | | N/A | N/A | N/A | N/A | N/A | N/A | N/A | N/A | N/A | N/A | N/A | N/A | N/A | N/A | N/A |

[kJ/kg]

↑ ↑
Row R1  Row R2

Figure 5B

REFRIGERATING APPARATUS AND CONTROL DEVICE FOR REFRIGERATING MACHINE

CROSS-REFERENCE TO RELATED APPLICATIONS

This application claims the benefit of U.S. Provisional Application No. 61/798,082, filed on Mar. 15, 2013. U.S. Provisional Application No. 61/798,082 is hereby incorporated herein by reference.

BACKGROUND

Field of the Invention

The present invention generally relates to a refrigerating apparatus and a control device for refrigerating machine.

Background Information

U.S. Pat. No. 6,036,432 to Sishtla et al. is directed to a METHOD AND APPARATUS FOR PROTECTING CENTRIFUGAL COMPRESSORS FROM ROTATING STALL.

U.S. Pat. No. 5,894,736 to Beaverson et al. is directed to METHODS AND APPARATUSES FOR DETECTING SURGE IN CENTRIFUGAL COMPRESSORS.

US Patent Publication No. 2011/0093133 to Turney et al. is directed to CONTROLLERS AND METHODS FOR PROVIDING COMPUTERIZED GENERATION AND USE OF A THREE DIMENSIONAL SURGE MAP FOR CONTROL OF CHILLERS.

U.S. Pat. No. 5,355,691 to Sullivan et al. is directed to a CONTROL METHOD AND APPARATUS FOR CENTRIFUGAL CHILLER USING A VARIABLE SPEED IMPELLER MOTOR DRIVE.

SUMMARY (Problem) To provide a refrigerating apparatus and a control device for refrigerating machine wherein an efficient operation during a normal time and the surge detection functions of high accuracy during an emergency time are made to coexist regardless of the size of the load or the presence of a hot gas bypass.

(Solution) The operating head is calculated by considering the effect of the suction temperature, the effect of the location where the chiller is installed, and the difference between the sensing locations and the actual discharge and inlet locations of the compressor and is comparatively verified with a compressor map, whereby the position of the current operating head and the surge point can be grasped at a greater accuracy and highly accurate control of the rotational speed (rotational frequency) and surge detection are enabled.

BRIEF DESCRIPTION OF THE DRAWINGS

Referring now to the attached drawings which form a part of this original disclosure:

FIG. 2A to 2C illustrates coordination control between the $1^{st}$ (high stage) and $2^{nd}$ (low stage) expansion valves in the centrifugal two-stage chiller in FIG. 1A.

FIG. 5B illustrates influence of atmospheric pressure on head calculation;

DETAILED DESCRIPTION OF EMBODIMENT(S)

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

In the embodiments, the following words mean as described below.

IGV is abbreviation for Inlet Guide Vane. This mechanism is generally used for adjusting performance of a centrifugal (or turbo) compressor. IGV is coupled to a gas intake port of the compressor.

DDC is an abbreviation for Discharge Diffuser Control. This mechanism is for adjusting performance of a centrifugal (or turbo) compressor and expanding operating region (avoiding surge). Diffuser refers to a passage in which refrigerant gas, which has been accelerated by a compressor impeller, converts dynamic pressure (speed) into static pressure (so-called pressure).

IPLV is an abbreviation for Integrated Part Load Value. IPLV is a performance indicator set by AHRI (Air-Conditioning, Heating and Refrigeration Institute) for a chiller when the chiller is assumed to operate throughout a year (including partial load operation).

TR is an abbreviation for TonsR (American refrigeration ton). Refrigeration ton is often used with large size chillers for indicating the chiller's capacity.

Head refers to pressure rising property of the compressor. In the embodiments, head has a unit of energy (KJ/kg), and used as a theoretical pressure rising property when gas is compressed under adiabatic (isentropic) state.

Surge refers to violent vibration of entire gas, which circulates in the compressor, connection pipes and heat exchangers, along a direction of gas flow, which is caused when the pressure rising property of the centrifugal compressor temporarily falls below the required operation pressure difference (=condensation pressure−evaporation pressure) of the heat exchangers of the chiller. Since this vibration can cause damages to the internal parts of the compressor and decrease reliability of the chiller, the avoidance control should be promptly performed or the chiller should be stopped immediately once the surge occurs.

Figure 1A:
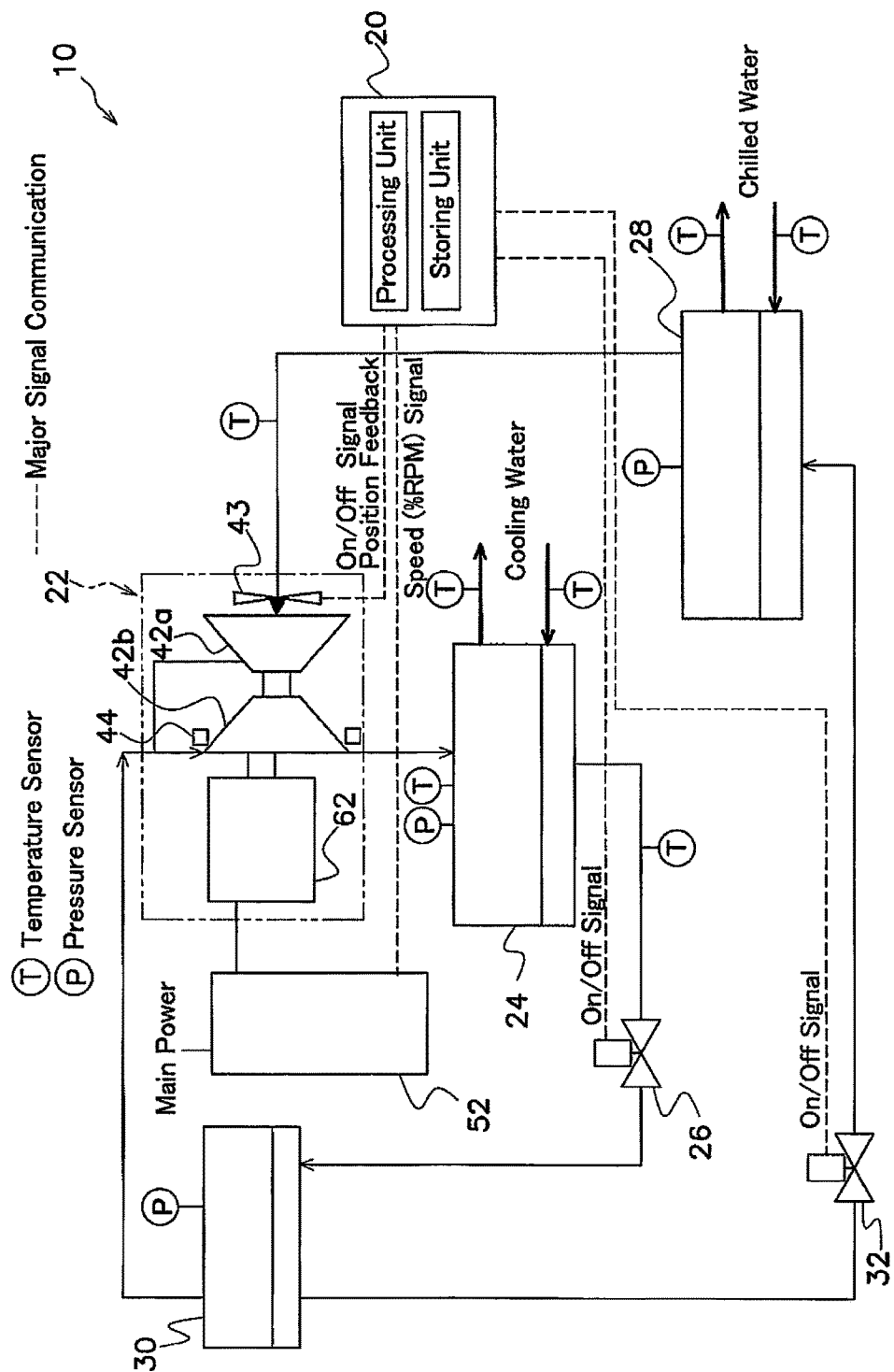
FIG. 1A illustrates a centrifugal 2-stage chiller in accordance with a first embodiment.
Figure 1B:
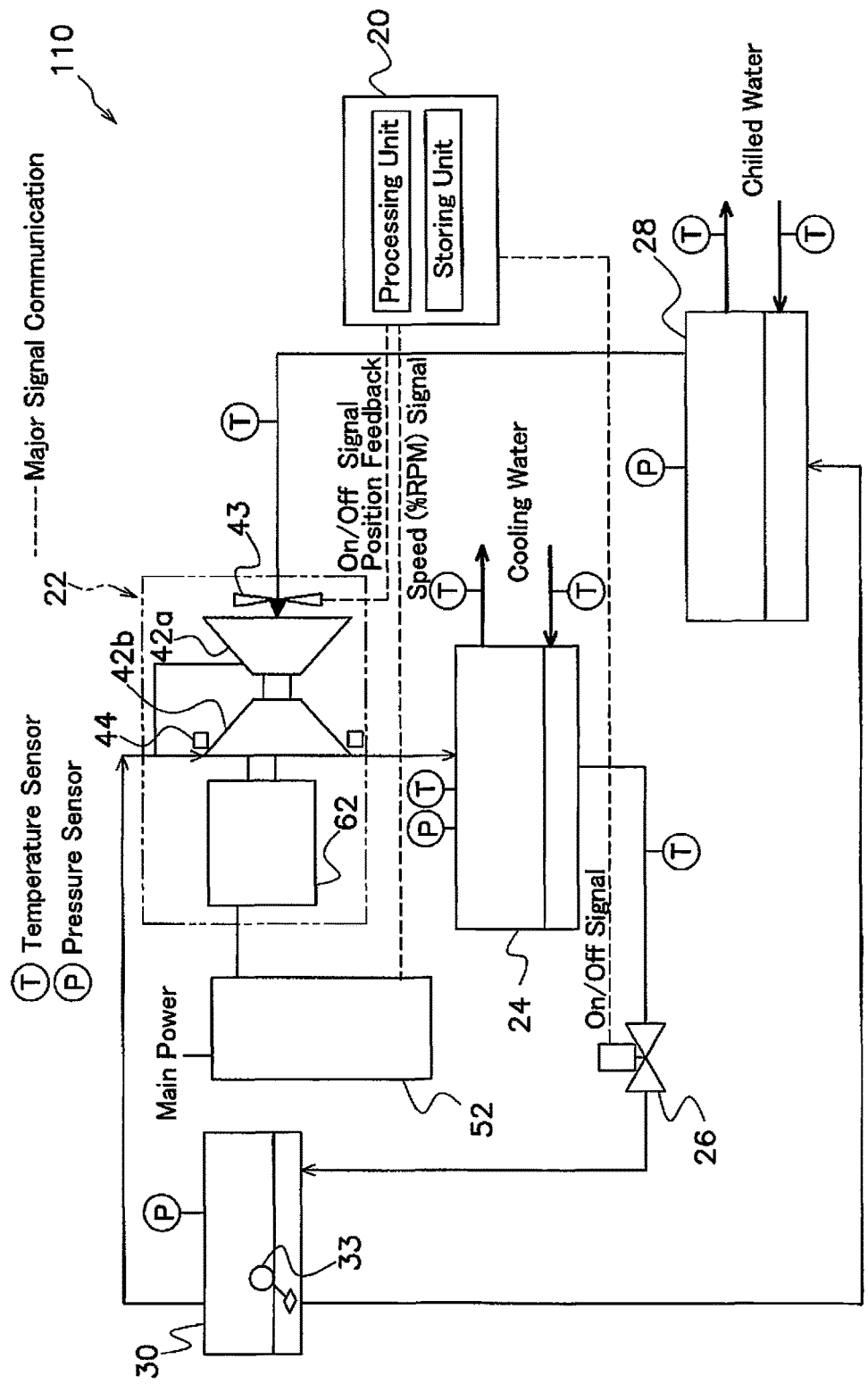
FIG. 1B illustrates a centrifugal 2-stage chiller in accordance with a second embodiment.
Figure 1C:
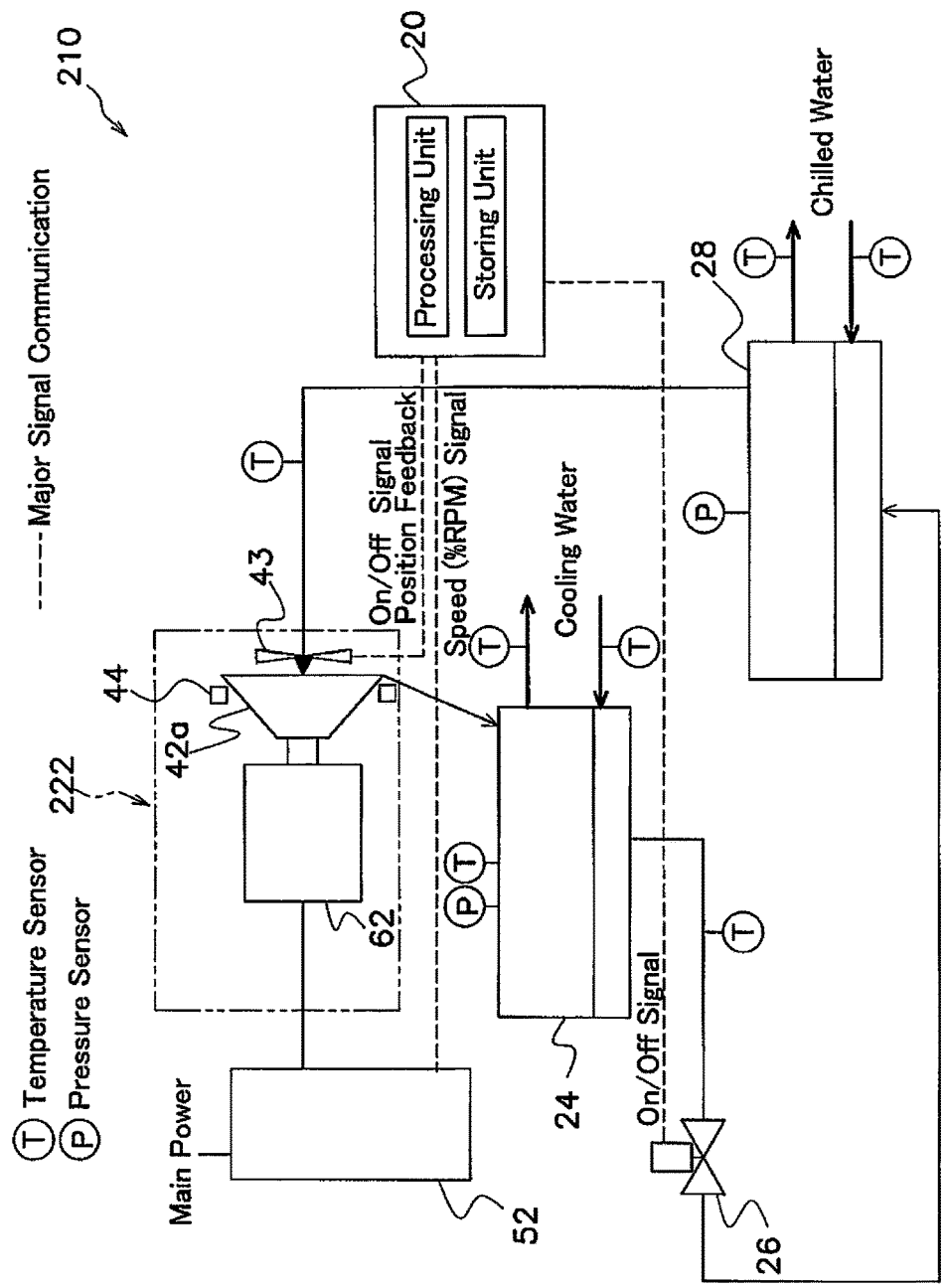
FIG. 1C illustrates a centrifugal single stage chiller in accordance with a third embodiment.

FIG. 1A illustrates a centrifugal two-stage chiller 10, FIG. 1B illustrates a centrifugal two-stage chiller 110, and FIG. 1C illustrates a centrifugal single stage chiller 210. The chillers 10, 110 and 210 are preferably water chillers that utilize cooling water and chilled water in a conventional manner.

The chiller 10 basically includes a chiller controller 20, a centrifugal compressor 22, a condenser 24, a $1^{st}$ (high stage) expansion valve 26 and an evaporator 28 interconnected to each other using piping in a conventional manner. An economizer 30 is interconnected between the condenser 24 and the evaporator 28 via piping in a conventional manner. The $1^{st}$ expansion valve 26 is connected in the piping between the condenser 24 and the economizer 30, while a $2^{nd}$ (low stage) expansion valve 32 is connected in the piping between the economizer 30 and the evaporator 28. The economizer 30 is further connected to the centrifugal compressor 22 to supply refrigerant gas from the economizer 30 to the centrifugal compressor 22.

The centrifugal compressor 22 includes a $1^{st}$ (low stage compression mechanism 42a and a $2^{nd}$ (high stage) compression mechanism 42b. The output from the $1^{st}$ compression mechanism 42a is supplied to an inlet of the $2^{nd}$ compression mechanism 42b. The refrigerant gas from the economizer 30 is also supplied to the inlet of the $2^{nd}$ compression mechanism 42b. A Variable Frequency Drive (VFD) panel (an inverter control panel) 52 controls a drive motor 62, which drives the centrifugal compressor 22. An inlet guide vane 43 is disposed on an inlet side of the $1^{st}$ compression mechanism 42a. Discharge Diffuser Control System (DDC) 44 is disposed at the diffuser on the side of the $2^{nd}$ compression mechanism 42b of the centrifugal compressor 22.

The chiller controller 20 is communicably (e.g., electrically) connected to the $1^{st}$ and $2^{nd}$ expansion valves 26 and 32, the inlet guide vane 43 and the VFD panel 52. The chiller controller 20 can send and receive information from these parts. In addition, various pressure and temperature sensors are disposed in the chiller 10 and communicate with the chiller controller 20. The $1^{st}$ and $2^{nd}$ expansion valves 26 and 32 individually or in combination can be considered as an expansion mechanism in accordance with this disclosure. In the centrifugal chiller 10, the $1^{st}$ expansion valve 26 can be controlled in the same manner as is controlled in the centrifugal chillers 110 and 210. Alternatively, control of the $1^{st}$ and $2^{nd}$ expansion valves 26 and 32 can be coordinated by the chiller controller 20 to achieve the results disclosed herein. The control in which control/operation of the $1^{st}$ and $2^{nd}$ expansion valves 26 and 32 is coordinated is explained below.

The coordination between the $1^{st}$ and $2^{nd}$ expansion valves 26 and 32 is performed by controlling a ratio of the refrigerant flow amounts on the high stage side and the low stage side so that the mass balance and heat balance at the economizer 30 are balanced out. When the mass balance and heat balance at the economizer 30 are balanced out, the flow amount ratio on the high stage side and the low stage side can be calculated. The values used in this calculation can be calculated using the pressure sensor in the economizer 30 and the temperature sensor for liquid refrigerant at the outlet of the condenser 24.

The control in which control/operation of the $1^{st}$ and $2^{nd}$ expansion valves 26 and 32 is coordinated is further explained in reference to FIGS. 2A, 2B, and 2C.

In the refrigerating cycle, the low stage side refrigerant flow rate M (refer to FIG. 2A) is calculated based on the property of the centrifugal compressor 22. Hel and Heg in FIG. 2A are saturated enthalpies, which can be calculated based on Pecon. (pressure at the economizer 30) in FIG. 2A. Hcl in FIG. 2A is an enthalpy of supercooled liquid, which can be calculated based on the fluid temperature at the outlet of the condenser 24. M+m (refrigerant flow rate discharged from the $2^{nd}$ compression mechanism 42b) is calculated based on the Equation 1 described later. Pcond. (pressure at the condenser 24), Pecon., and Pevap. (pressure at the evaporator 28) in FIG. 2A are known because pressure sensors are provided. In other words, high stage side pressure difference across the $1^{st}$ expansion valve 26 and low stage side pressure difference across the $2^{nd}$ expansion valve 32 are known. Properties (pressure difference-flow amount properties) of high stage side and low stage side expansion valves 26 and 32 are maintained within software. Opening degree of the high stage side $1^{st}$ expansion valve 26 is controlled so as to obtain flow rate M+m under the monitored high stage side pressure difference (refer to FIG. 2B). Opening degree of the low stage side $2^{nd}$ expansion valve 32 is controlled so as to obtain flow rate M under the monitored high stage side pressure difference (refer to FIG. 2C).

The following Equation 1 can be theoretically obtained based on the mass balance and heat balance at the economizer 30.

$$(M+m)/M=\{1+(Hcl-Hel)/(Heg-Hcl)\} \quad \text{(Equation 1)}$$

Equation 1 provides a flow amount ratio between the high stage side $1^{st}$ expansion valve 26 and the low stage side $2^{nd}$ expansion valve 32, and forms the basis of the coordination between the opening degrees of the $1^{st}$ and $2^{nd}$ expansion valves 26 and 32.

The centrifugal chiller 110 of FIG. 1B is identical to that of FIG. 1A, except the $2^{nd}$ expansion valve 32 is omitted. In the centrifugal chiller 110, mechanical float valve 33 without electric control is used in place of the $2^{nd}$ expansion valve 32. Therefore, the chiller controller 20 of the centrifugal chiller 110 only controls operation of the $1^{st}$ expansion valve 26 as expansion mechanism control, and the $1^{st}$ expansion valve 26 is considered as an expansion mechanism in accordance with this disclosure.

The centrifugal chiller 210 of FIG. 1C is identical to the centrifugal chiller 110 of FIG. 1B, except the economizer 30 is eliminated, and a modified centrifugal compressor 222 is provided in which the $2^{nd}$ compression mechanism 42b is eliminated (In comparison with the centrifugal chiller 10 in FIG. 1A, the expansion valve 32 is further eliminated). Therefore, the chiller controller 20 of the centrifugal chiller 210 only controls operation of the $1^{st}$ expansion valve 26 as expansion mechanism control, and the $1^{st}$ expansion valve 26 is considered as an expansion mechanism in accordance with this disclosure. Because the economizer 30 and the $2^{nd}$ compression mechanism 42b are eliminated, the piping is modified. Piping connects the condenser 24 to the evaporator 28, with the $1^{st}$ expansion valve 26 connected in the piping between the condenser 24 to the evaporator 28. In addition, because the economizer 30 and the $2^{nd}$ compression mechanism 42b are eliminated, output of the $1^{st}$ compression mechanism 42a is supplied to the condenser 24 (without merging with refrigerant gas from an economizer or passing through a $2^{nd}$ stage compression mechanism).

The parts of the centrifugal chillers 10, 110 and 210 are conventional components that are well known in the art. Since these components are well known in the art, these structures will not be discussed or illustrated in detail herein. Rather, it will be apparent to those skilled in the art from this disclosure that the components can be any type of structure and/or programming that can be used to carry out the present invention.

The chiller controller 20 is an example of a controller of the refrigerating apparatus. Also the chiller controller 20 is an example of a control device for refrigerating machine. The chiller controller 20 preferably includes a microcomputer as a processing unit that controls the parts of the centrifugal chillers 10, 110 and 210 as disclosed herein. The chiller controller 20 preferably includes a computer readable medium (e.g., memory, hard disk, etc.) with an executable control program stored thereon or is communicable with such a computer readable medium in order to execute the control program. The chiller controller 20 also preferably includes other conventional components such as an input interface circuit, an output interface circuit, and storage devices such as a ROM (Read Only Memory) device and a RAM (Random Access Memory) device to store programming, calculations and/or results. The computer readable medium (e.g., memory, hard disk, etc.) and the storage devices such as the ROM device and the RAM device are examples of a storage unit. The microcomputer of the chiller controller 20 is programmed to control and/or receive information from parts of the centrifugal chillers 10, 110 and 210 as explained above. It will be apparent to those skilled in the art from this disclosure that the precise structure and algorithms for the chiller controller can be any combination of hardware and software that will carry out the functions of the present invention.

An opening degree of the expansion mechanism ($1^{st}$ and/or $2^{nd}$ expansion valves 26 and 32) is calculated by the chiller controller 20 using compressor capacity as one of indices of change in load. The compressor capacity is obtained from factors which are a current rotation number of the compressor (the centrifugal compressor 22 in the chiller 10, 110 or the centrifugal compressor 222 in the chiller 210), an opening degree of a capacity control mechanism (inlet guide vane 43), and a divergence rate of a current operation head from a surge region. The divergence rate is preferably a ratio between the driving head and a compressor surge head at that time. Preferably, at least the high stage side expansion mechanism is a target of calculation of the opening degree of the expansion mechanism. In other words, an opening degree of the $1^{st}$ expansion mechanism ($1^{st}$ expansion valve 26) is calculated for the centrifugal chillers 10, 110 and 210. However, in the chiller 10, operation of the $1^{st}$ expansion mechanism ($1^{st}$ expansion valve 26) can be coordinated with the $2^{nd}$ expansion mechanism ($2^{nd}$ expansion valve 32) as explained with reference to FIGS. 2A, 2B and 2C.

Preferably, an actual control opening degree of the high stage side expansion mechanism ($1^{st}$ expansion valve 26) is corrected by a liquid-gas ratio by weight in the economizer 30 obtained from enthalpy of liquid at an outlet of the condenser 24 and saturated enthalpies of liquid and gas at the economizer 30.

Preferably, the low stage side expansion mechanism ($2^{nd}$ expansion valve 32) is controlled by electrical operation, and an opening degree of the low stage side expansion mechanism ($2^{nd}$ expansion valve 32) is coordinated with a calculated opening degree of the high stage side expansion mechanism ($1^{st}$ expansion valve 26) as explained with reference to FIGS. 2A, 2B and 2C.

Alternatively, a mechanical float valve 33 in the economizer 30 is used as the low stage side expansion mechanism as shown in FIG. 1B. In such a case, the mechanical float valve 33 automatically opens/closes so that the fluid level in the economizer 30 is maintained at a prescribed level so as to be coordinated with operation/control of the high stage side expansion mechanism ($1^{st}$ expansion valve 26).

Pseudo chilled water inlet and outlet temperature difference is used for calculation of the opening degree of the expansion mechanism. Pseudo chilled water inlet and outlet temperature difference being obtained from the compressor capacity calculated above, evaporator capacity acquired from enthalpy information of the evaporator 28 and the economizer 30, and a standard design flow rate of chilled water (a standard design flow rate of chilled water supplied to the evaporator 28) of equipment. The pseudo chilled water inlet/outlet temperature difference is a design temperature difference when a design standard chilled water amount flows in the evaporator of the chiller.

A current actual flow rate of chilled water is estimated by the chiller controller 20 by comparing pseudo chilled water inlet and outlet temperature difference with measured chilled water inlet and outlet temperature difference in actual operation. The pseudo chilled water inlet and outlet temperature difference is obtained from compressor capacity obtained based on a current rotation number of a compressor (the centrifugal compressor 22 in the chiller 10, 110 or the centrifugal compressor 222 in the chiller 210), and an opening degree of a capacity control mechanism (inlet guide vane 43), evaporator capacity obtained by inlet and outlet refrigerant circuit enthalpy difference of the evaporator 28, and a standard design flow rate of chilled water (a standard design flow rate of chilled water supplied to the evaporator 28) of equipment.

Preferably, the equipment (chiller 10, 110, 120) is stopped, an alarm is issued, or a request to increase or decrease a water amount (amount of water supplied to the evaporator 28) is made by the chiller controller 20 when the estimated actual flow rate of chilled water is outside a design acceptable flow rate range of chilled water.

Features of this disclosure are explained below.

Three cases (Condenser water delta temperature, Evaporator water delta temperature or Internally calculated pseudo evaporator water delta temperature (pseudo chilled water inlet and outlet temperature difference) are selectable as with capacity source factor for calculating the opening degree of expansion valve (refer to Table 1).

TABLE 1

| | Expansion Valve Mode | | |
|---|---|---|---|
| Mode | Capacity Source Factor | Source mainly to be checked | Description |
| Capacity | C_DT | Condenser water (Out - In) ΔT | Mainly work when Evaporator Leaving Water Temperature (ELWT) is under control. |
| | E_DT | Evaporator water (In - Out) ΔT | |
| | Internal | Internally calculated pseudo E_DT (PE_DT) | |

When expansion valve is controlled in capacity mode, the target opening degree of the expansion valve is calculated with Equation 2

$$EXV\_POS = \{(553*EXV\_Cap - 48*Lift\ Temperature)/100 + Offset\}*Gain/100 + Exv\_Os \quad \text{(Equation 2)}$$

In Equation 2, the symbols have meanings as follows. EXV_POS is a value obtained by multiplying the target opening degree (%) of the expansion valve by 10. EXV_Cap is a capacity source factor for calculating the opening degree of the expansion valve. The value obtained by multiplying the Condenser water delta temperature (C_DT in Table 1, the actual temperature difference of the cooling water between the condenser outlet and the condenser inlet) (degF) by 10 or the value obtained by multiplying the Evaporator water delta temperature (E_DT in Table 1, the actual temperature difference of the chilled water between the evaporator inlet and the evaporator outlet) (degF) by 10 can be used as EXV_Cap. When the capacity source factor is set as "Internal", calculated pseudo evaporator water delta temperature (PE_DT, pseudo chilled water inlet and outlet temperature difference) is used as EXV_Cap instead of the actual water DT (C_DT or E_DT). Lift temperature is a temperature difference (degF) between the corresponding saturation temperature of the refrigerant at the condenser and the corresponding saturation temperature of the refrigerant at the evaporator. Even if the opening degree of the expansion valve is unchanged, the amount of the refrigerant flowing in the expansion valve increases when the differential pressure across the expansion valve increases. By using Lift temperature as a state variable representing a differential pressure, the opening degree of the expansion valve obtained from the EXV_cap (capacity of the chiller) can be corrected. Offset is a predetermined constant. Gain is a value obtained by correcting a predetermined constant, which is used under the rated operation condition, according to the compressor capacity. EXV_OS is a variable determined according to the operation condition (supercooling degree of the refrigerant at the outlet of the condenser and superheating degree of the refrigerant at the inlet of the compressor).

Pseudo evaporator water delta temperature (PE_DT, pseudo chilled water inlet and outlet temperature difference) is unique concept which allows using existing electric expansion valve opening degree calculating logic, which usually uses actual water temperature difference as capacity, without actual water temperature information. Therefore the pseudo evaporator water delta temperature is beneficial when the user of the chiller wants to perform a variable water flow control.

To use PE_DT in expansion valve opening degree calculation, "Internal" should be selected as "Capacity Control Source" in expansion valve control setting.

Calculation for obtaining PE_DT involves detail compressor performance characteristics calculation, like volumetric flow calculation, compressor head calculation and detail gas/liquid property calculation (density, enthalpy), so that it is effective when detail compressor mapping info (surge head and volumetric flow-head relationship) is well-known.

Figure 3:
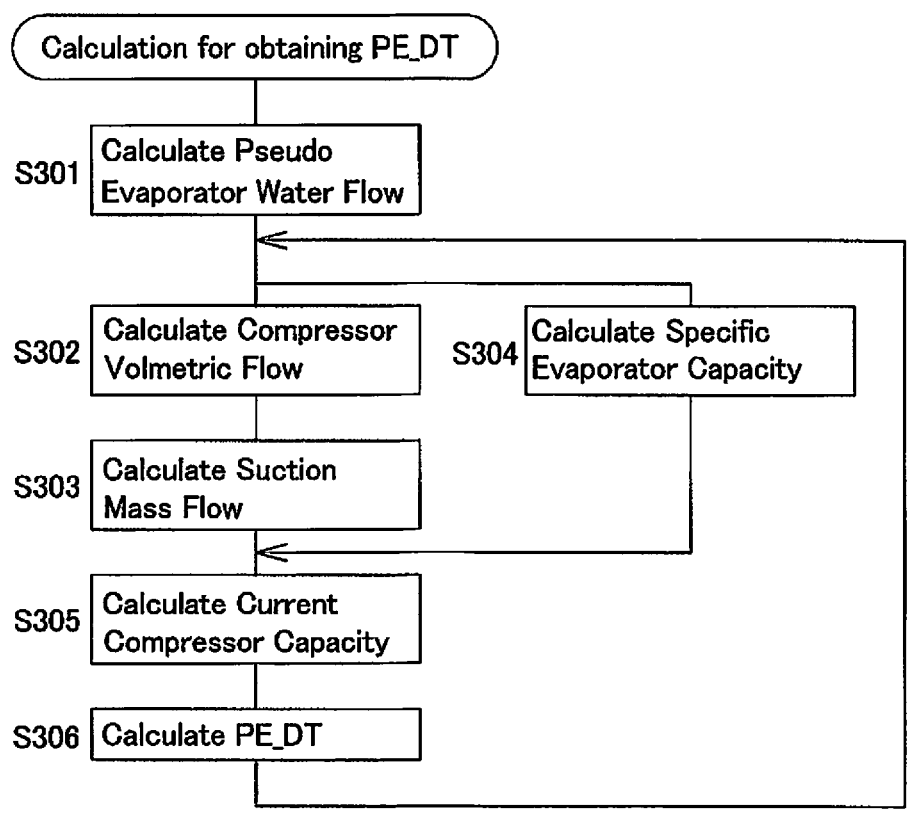
FIG. 3 illustrates a flowchart for PE_DT (pseudo evaporator water delta temperature, pseudo chilled water inlet and outlet temperature difference) calculation processing.

Processing for calculating PE_DT is explained with reference to the flow chart in FIG. 3.

In Step S301, pseudo evaporator water flow (m³/hr) is calculated. The pseudo evaporator water flow is calculated with Equation 3.

Pseudo Evaporator Water Flow (m³/h)=Rating Compressor Capacity*3024 (kcal/h/TR)/Pseudo Rating Water $DT/Cpw/Dw$ (Equation 3)

Cpw and Dw in Equation 3 are characteristic values of the fluid. Cpw is a fluid isobaric specific heat and Dw is a fluid density. In Equation 3, rating compressor capacity, pseudo rating water DT, Cpw and Dw are setting values. The unit of the rating compressor capacity is TR (American refrigeration ton). The rating compressor capacity is a value within a range between 200 TR and 2000 TR. Default of the rating compressor capacity is 800 TR. The pseudo rating water DT is a value within a range between 3.0 (degC) and 15.0 (degC). Default of the pseudo rating water DT is 5.0 (degC). Cpw is a value within a range between 0.5 (kcal/kg/degC) and 1.5 (kcal/kg/degC). Default of Cpw is 1.0 (kcal/kg/degC). Dw is a value within a range between 500 (kg/m³) and 1500 (kg/m³). Default of Dw is 1000 (kg/m³). After the pseudo evaporator water flow is calculated, the process proceeds to Step S302 and Step S304.

In Step S302, compressor volumetric flow (m³/min) is calculated. The compressor volumetric flow is calculated with Equation 4

Compressor Volumetric Flow=Rating Volumetric Flow*Coefficient $Fc$*Coefficient $Fd$*Correction Factor with DDC*Correction Factor with Shroud Cut Model (Equation 4)

Shroud means an outer shape of the vanes of the impeller in the compressor. Shroud Cut Model is a model in which the capacity is adjusted by lowering the height of the impeller vanes and reducing the cross section area of the gas passage part.

Coefficient Fc in Equation 4 is a function using a compressor rotational speed ratio (% RPM) and the chiller head divided by the rating surge head as variables (Coefficient Fc=function f1(% RPM, chiller head/rating surge head)). The compressor rotational speed ratio (% RPM) is obtained by dividing the current rotational speed of the compressor by the rating rotational speed of the compressor. Coefficient Fc is equal to the value obtained by dividing the compressor volumetric flow at the current compressor rotational speed ratio (% RPM) under a condition of the opening degree of the inlet guide vane 43 is 100%, by the rated volumetric flow. Coefficient Fd in Equation 4 is a function using the opening degree (%) of the inlet guide vane 43 and the chiller head divided by the current surge head as variables (Fd=function f2(% IGV, chiller head/current surge head)). Coefficient Fd is equal to the value obtained by dividing the compressor volumetric flow at the current compressor rotational speed ratio (% RPM) and the current opening degree of the inlet guide vane 43, by the compressor volumetric flow at the current compressor rotational speed ratio (% RPM) under a condition of the opening degree of the inlet guide vane 43 is 100%. Correction Factor with DDC in Equation 4 is a correction factor of the volumetric flow, when the opening degree of DDC is less than 100% After the compressor volumetric flow is calculated, the process proceeds to Step S303.

In Step S303, a suction mass flow (kg/h) is calculated. The suction mass flow is calculated with Equation 5. Suction gas density in Equation 5 is calculating by using the suction pressure and the suction temperature. The suction pressure is obtained by subtracting the calculated suction side pressure loss corresponding to the current compressor volumetric flow from the measured pressure at the evaporator.

Suction Mass Flow=Compressor Volumetric Flow (m³/min)*60 (min/h)*Suction Gas Density (kg/m³) (Equation 5)

In Step S304, a specific evaporator capacity (kJ/kg) is calculated. The specific evaporator capacity is calculated with Equation 6.

Specific Evaporator Capacity=Suction Gas Enthalpy ($Hsg$) (kJ/kg)−Enthalpy of Saturated Liquid at Economizer ($Hel$) (kJ/kg) (Equation 6)

In Step S305, the current compressor capacity (TR) is calculated based on the calculation results in Step S303 and Step S304. The current compressor capacity is calculated with Equation 7.

Current Compressor Capacity (TR)=Suction Mass Flow (kg/h)*Specific Evaporator Capacity (kJ/kg)/4.1868 (kJ/kcal)/3024 (kcal/h/TR) (Equation 7)

In Step S306, the pseudo evaporator water delta temperature (PE_DT, the pseudo chilled water inlet and outlet temperature difference) is calculated based on the calculation result in Step S305. The pseudo evaporator water delta temperature (PE_DT, the pseudo chilled water inlet and outlet temperature difference) is calculated with Equation 8. Cpw and Dw in Equation 8 are identical with Cpw and Dw in Equation 3. The pseudo evaporator water flow in Equation 8 is design flow rate and set value.

Pseudo Evaporator Water Delta Temperature
(PE_DT)=Current Compressor Capacity
(TR)*3024 (kcal/h/TR)/Pseudo Evaporator
Water Flow (m³/h)/*Cpw* (kcal/kg/degC)/*Dw*
(kg/m³)     (Equation 8)

After the pseudo evaporator water delta temperature (PE_DT) is calculated in Step S306, the process is returned to Step S302 and Step S304 and the pseudo evaporator water delta temperature (PE_DT) are calculated repeatedly.

Generally, the evaporator refrigerant circulation amount can be calculated by using Equation 5 whether the operation cycle is single-stage or 2-stage. But, in the case that especially the operation cycle is two stage cycle having a economizer (refer to FIG. 2A) and the operating degree of the high stage expansion valve is calculated, (M+m) calculated with Equation 9, which is obtained by transforming the Equation 1, is preferably used as the evaporator refrigerant circulation amount. Control with high precision can be achieved by using the evaporator refrigerant circulation amount modified with the amount of gas supplied from the economizer 30 to the high stage compression mechanism ($2^{nd}$ compression mechanism 42b) of the centrifugal compressor 22.

(M+m)={1+(Hcl−Hel)/(Heg−Hcl)}*M     (Equation 9)

Also, {1+(Hcl−Hel)/(Heg−Hcl)} in Equation 1 indicates a ratio of refrigerant circulation amounts between the high stage side and the low stage side. Therefore, when an electric $2^{nd}$ expansion valve 32 is also used for the low stage side as shown in FIG. 1A, it is better to coordinate the opening degrees of the high stage side and the low stage side by taking this into consideration.

In Table 2, one case where the target opening degree of the expansion valve is calculated by Equation 2 with C_DT or E_DT and the other case where the target opening degree of the expansion valve is calculated by Equation 2 with PE_DT are compared.

because it is not influenced by actual water amount and temperature difference. Thus it is easy to optimize performance according to the compressor. Also, the control response is improved as compared to the prior art because there is no water temperature detection step. Coordination between the compressor and the expansion valve during the load fluctuation period and the transition period is improved, and thus, controllability of water temperature is improved.

The pseudo water delta temperature (PE_DT) is obtained by calculating Equation 8 (Pseudo Evaporator Water Delta Temperature (PE_DT)=Current Compressor Capacity*3024/Pseudo Evaporator Water Flow/Cpw/Dw).

The compressor capacity corresponds well to the chiller capacity, and the actual evaporator water delta temperature (EDT) is obtained by calculating Current Compressor Capacity*3024/(Current actual evaporator water flow)/Cpw/Dw.

Thus the current actual evaporator water flow can be estimated by comparing E_DT with PE_DT.

In a centrifugal refrigeration system (apparatuses—i.e. centrifugal chillers 10, 110, 210 disclosed herein), a compressor-specific surge curve is compared with an isentropic head to perform a compressor rotational speed control, a compressor rotational speed adjustment control for avoiding surge, and a compressor emergency shutdown control upon detection of surge by a processing unit of a chiller controller 20. The compressor-specific surge curve is stored in a storage unit of the chiller controller 20 in advance (e.g., prior to operation). The compressor-specific surge curve is defined by an actual rotational speed of a compressor (centrifugal compressor 22 in the chiller 10, 110 or centrifugal compressor 222 in the chiller 210), an opening degree of a capacity control mechanism (inlet guide vane 43), and an opening degree of a discharge capacity control mechanism (discharge diffuser control system 44). The isentropic head is calculated based on a suction pressure and a discharge pressure during operation. A suction temperature is also taken into consideration in the calculation of the isentropic head.

Figure 4:
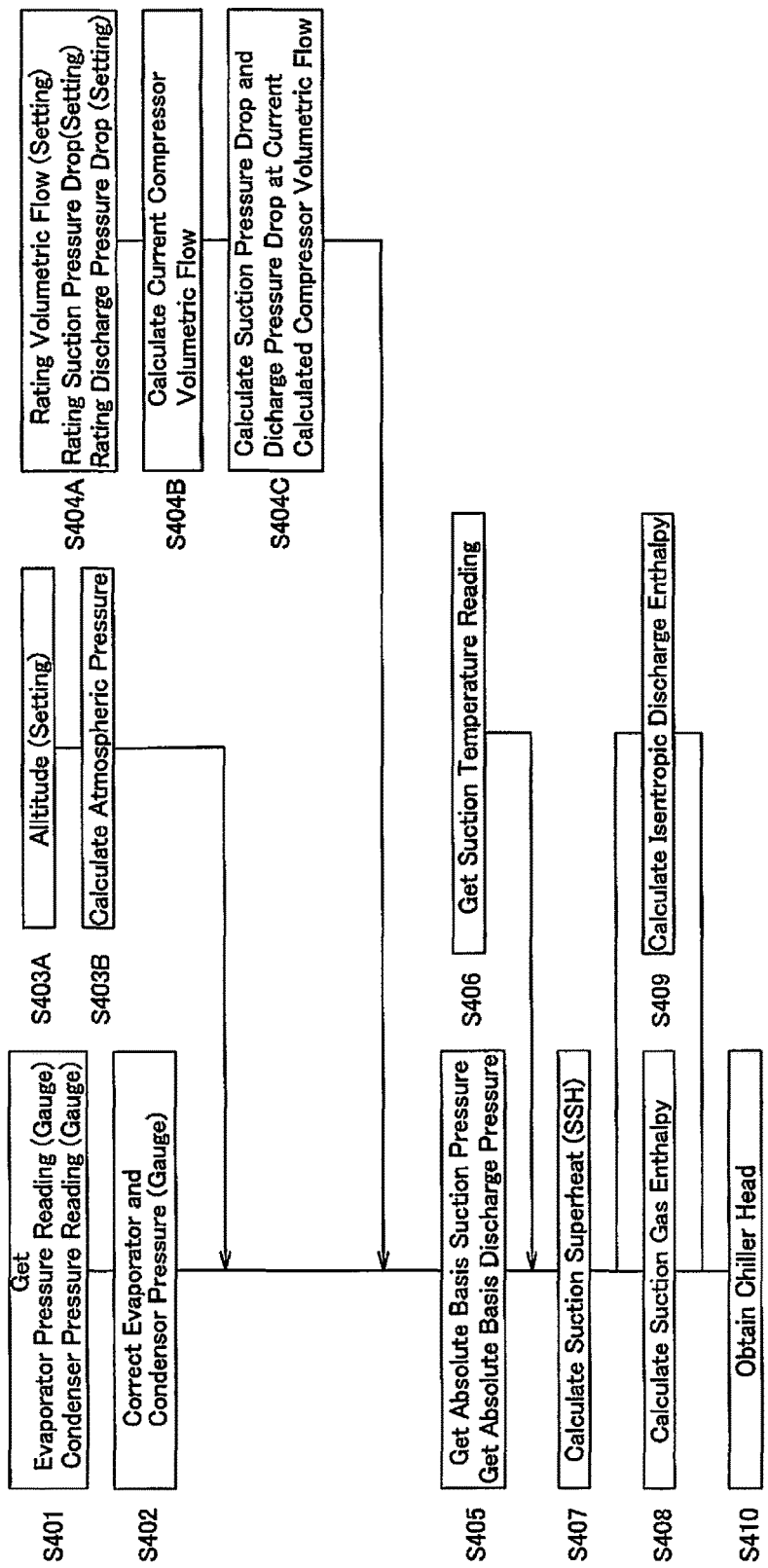
FIG. 4 illustrates chiller head calculation flow according to one embodiment.

For example, FIG. 4 illustrates a control flow according to one embodiment for calculating the chiller head considering the suction temperature, the altitude of the installation location, and the discharge and suction pressure loss.

The control flow in FIG. 4 is explained.

TABLE 2

|  | Influenced by the user's specification and actual operating condition | Compatibility with water side variable flow amount control | Gain, Offset, etc. Parameter | Control responsiveness of the expansion valve |
|---|---|---|---|---|
| C_DT or E_DT | Yes | Difficult | Adjusted for the user's specification on a case-by-case basis | Relatively Slow<br>1. User's load variation<br>2. Compressor capacity control<br>3. Water temperature variation<br>4. Expansion valve opening degree change |
| PE_DT | No | Possible | Uniformed design is possible. Standardization of the expansion valve opening degree calculation | Fast<br>1. User's load variation<br>2. Compressor capacity control<br>3. Expansion valve opening degree change |

When C_DT or E_DT is used, even when the same chiller is used, different Gain/Offset parameters for calculating the opening degree of the expansion valve are required if the water temperature difference required by the user is different. By introducing PE_DT, standardization of the expansion valve opening degree and the parameters is possible In Step S401, an evaporator pressure reading (gauge pressure) and a condense pressure reading (gauge pressure) are obtained from pressure sensors attached to the evaporator 28 and the condenser 24.

In Step S402, evaporator pressure (gauge pressure) and condense pressure (gauge pressure) are obtained by correcting the evaporator pressure reading (gauge pressure) and the condense pressure reading (gauge pressure) with Equation 10. Slope correction factor in Equation 10 is a setting from the chiller controller 20. For example, available range of the slope correction factor is from 0.9900 to 1.0100 and default of the slope correction factor is 1.0000. Offset is a setting from the chiller controller 20. For example, available range of the offset is from −50.0 to +50.0 kPa and default of the offset is 0.0 kPa.

$$\text{Pressure (kPaG, Gauge Pressure Standard)} = \text{Sloop Correction Factor} * \text{Pressure Reading (kPaG)} + \text{Offset} \quad \text{(Equation 10)}$$

Figure 5A:
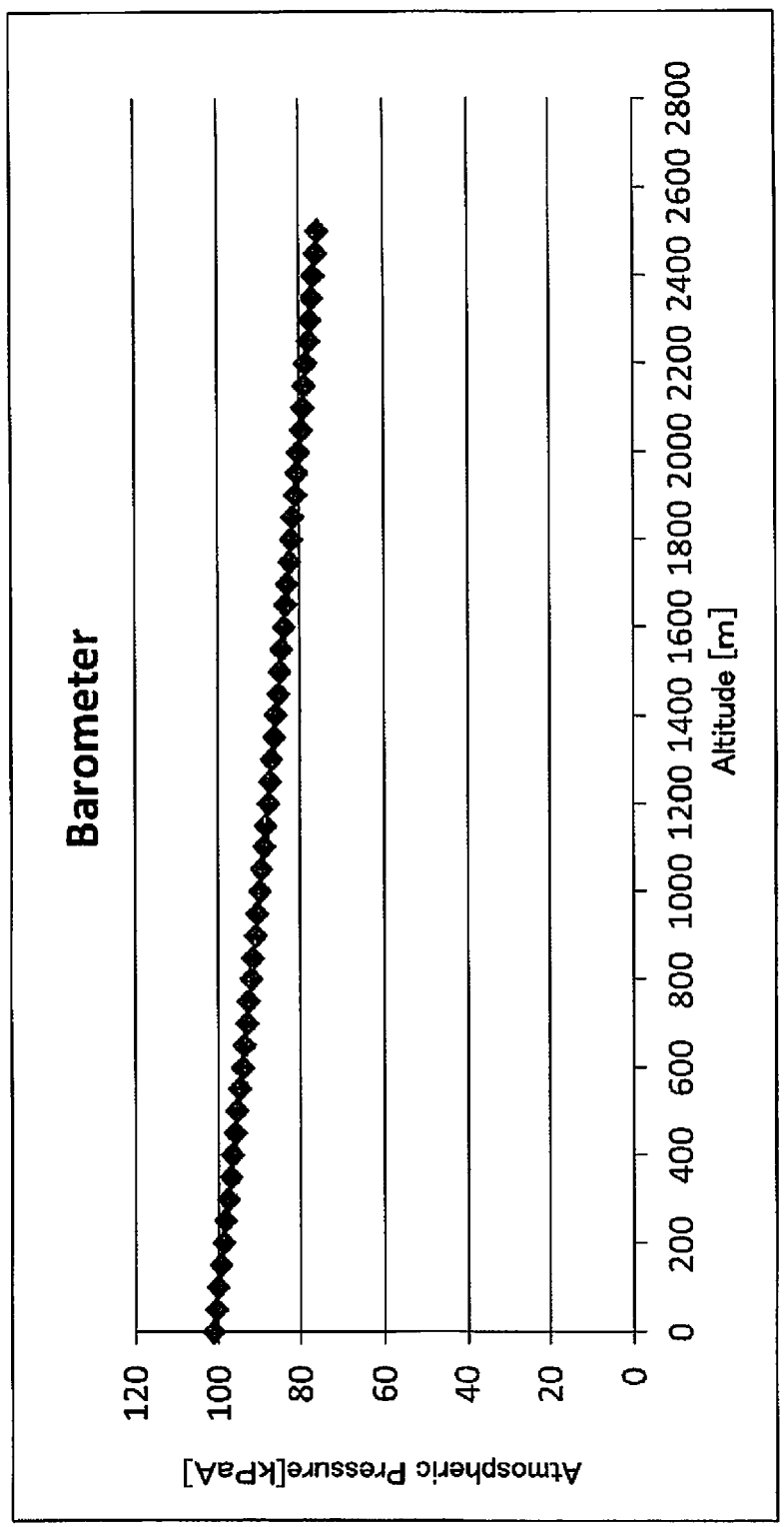
FIG. 5A illustrates relationship between altitude and atmospheric pressure.

In Step S403A, an altitude of the installation place of the chiller (chiller 10, 110, 210) is set to the chiller controller 20 as a setting, In Step S403B, atmospheric pressure is calculated. FIG. 5A shows relationship between altitude and atmospheric pressure. Calculated atmospheric pressure is used to convert pressure (gauge pressure) into absolute pressure in Step S405.

The reason why the measured gauge pressure is converted into absolute pressure in Step S405 is described below.

The inside of the chiller (refrigerant system) is absolute pressure system because it is completely blocked out from the atmosphere so that the refrigerant does not leak. Absolute pressure is a sum of gauge pressure and atmospheric pressure. Gauge pressure indicates a relative pressure with respect to the atmospheric pressure at that location. The gauge pressure changes depending on where the chiller is installed.

For example, as shown in a row R2 of the table in FIG. 5B, there are differences between heads by the suction pressures at a discharge pressure of 950 kPA (absolute pressure), a suction temperature of 5 degC, and a standard atmospheric pressure (101.3 kPa) when the altitude is 0 m (refer to a row R1 of the table in FIG. 5B) and heads at a discharge pressure of 950 kPA (absolute pressure), a suction temperature of 5 degC, and an atmospheric pressure of 81.3 kPa when the altitude is 2000 m. The idea of atmospheric pressure correction is required in order to accurately calculate the head and satisfy the factory default performance even in high altitude place such as Matsumoto City in Japan (Altitude: 600 m), Denver (Altitude: 1600 m) and Mexico City (Altitude: 2200 m).

Absolute pressure measuring sensors may be used to measure the pressure at various portions inside the chiller. But, the absolute pressure measuring sensor is uncommon and expensive. Most of the pressure sensors usually available are gauge pressure sensor. Therefore, in Step S405, measured gauge pressure is converted into absolute pressure.

Specifically, in Step S403B, the atmospheric pressure is calculated with Equation 11. In Equation 11, 101.325 (kPaG) is a standard gauge pressure at sea level and 15 degC. Altitude in Equation 11 is a setting set to meet the location where chiller is installed in Step S403A. The altitude is set to see best result in calculation. The available range of the altitude is from 0 to 3500 m. Default of the altitude is 0 m.

$$\text{Atmospheric Pressure (kPa)} = 101.325 \text{ (kPaG)} * \{1 - 0.0065 * \text{Altitude (m)} / (0.0065 * \text{Altitude (m)} + 15 + 273.15)\}^{5.257} \quad \text{(Calculation 11)}$$

In Step S404A, a rating volumetric flow, a rating suction pressure drop and a rating discharge pressure drop are set to the chiller controller 20 as settings.

In Step S404B, current compressor volumetric flow (m³/min) is calculated with the Equation 4.

In Step S404C, a suction pressure drop and a discharge pressure drop at the current compressor volumetric flow are calculated with Equations 12 and 13. The suction pressure drop is pressure drop (pressure loss) at the suction pipe. The discharge pressure drop is pressure drop (pressure loss) at the discharge pipe. Rating suction pressure drop in Equation 12 is a setting from the chiller controller 20, which is set to the chiller controller 20 in Step S404A. For example, available range of the rating suction pressure drop is from 0.0 to 50.0 kPa and default of the rating suction pressure drop is 5.0 kPa. Suction pressure drop offset in Equation 12 is a setting from the chiller controller 20. For example, available range of the suction pressure drop offset is from 0.0 to 50.0 kPa and default of the suction pressure drop offset is 0.0 kPa. Current volumetric flow in Equation 12 is the current compressor volumetric flow obtained in Step S404B. Rating volumetric flow in Equation 12 is a setting set in Step S404A. Rating discharge pressure drop in Equation 13 is a setting from the chiller controller 20 set in Step S404A. For example, available range of the rating discharge pressure drop is from 0.0 to 50.0 kPa and default of the rating discharge pressure drop is 3.0 kPa. Discharge pressure drop offset in Equation 13 is a setting from the chiller controller 20. For example, available range of the discharge pressure drop offset is from 0.0 to 50.0 kPa and default of the discharge pressure drop offset is 4.0 kPa. Current volumetric flow in Equation 13 is the current compressor volumetric flow obtained in Step S404B. Rating Volumetric Flow in Equation 13 is a setting set in Step S404A.

$$\text{Calculated Suction Pressure Drop (kPa)} = \text{Rating Suction Pressure Drop} * \% \text{ Volumetric Flow}^2 + \text{Suction Pressure Drop Offset} = \text{Rating Suction Pressure Drop} * (\text{Current Volumetric Flow} / \text{Rating Volumetric Flow})^2 + \text{Suction Pressure Drop Offset} \quad \text{(Equation 12)}$$

$$\text{Calculated Discharge Pressure Drop (kPa)} = \text{Rating Discharge Pressure Drop} * \% \text{ Volumetric Flow}^2 + \text{Discharge Pressure Drop Offset} = \text{Rating Discharge Pressure Drop} * (\text{Current Volumetric Flow} / \text{Rating Volumetric Flow})^2 + \text{Discharge Pressure Drop Offset} \quad \text{(Equation 13)}$$

A discharge pressure loss and a suction pressure loss at design gas flow of the compressor are set as the rating discharge pressure drop (setting) and the rating suction pressure drop (setting) respectively. A discharge pressure loss and a suction pressure loss at a gas flow other than the design gas flow are calculated by multiplying the square value of a ratio of gas flow at that moment with respect to the design gas flow as shown in Equations 12 and 13.

In Step S405, a suction pressure and a discharge pressure are calculated by absolute pressure using the evaporator pressure (gauge pressure) and the condense pressure (gauge pressure) obtained in Step S402, the atmospheric pressure calculated in Step S403B, and the suction pressure drop and the discharge pressure drop calculated in Step S404C.

In Step S405, gauge pressure is converted into absolute pressure with Equation 14 using the atmospheric pressure calculated in Step S403B.

$$\text{Pressure (kPaA, Absolute Pressure Basis)} = \text{Pressure (kPaG, Gauge Pressure Basis)} + \text{Atmospheric Pressure} \quad \text{(Equation 14)}$$

The absolute pressure is only used for refrigerant property calculation and compressor property calculation (volumetric flow, head, etc.). In other cases (HMI display, history/trend, settings and alarm detection etc.), the gauge pressure is used.

In Step S405, the suction pressure and the discharge pressure are calculated using the evaporator pressure (gauge pressure) and the condenser pressure (gauge pressure) obtained in Step S402 and the suction pressure drop and the discharge pressure drop calculated in Step S404C.

When the evaporator pressure (gauge pressure) and the condenser pressure (gauge pressure) are converted into absolute pressure in advance, suction pressure (absolute pressure) and discharge pressure (absolute pressure) are calculated with Equations 15 and 16.

Suction Pressure (kPaA)=Evaporator Pressure (kPaA)−Calculated Suction Pressure Drop (kPa)  (Equation 15)

Discharge Pressure (kPaA)=Condenser Pressure (kPaA)+Calculated Discharge Pressure Drop (kPa)  (Equation 16)

When the evaporator pressure (gauge pressure) and the condense pressure (gauge pressure) are not converted into absolute pressure in advance, the suction pressure (gauge pressure) and the discharge pressure (gauge pressure) are calculated with Equations 17 and 18. After that, suction pressure (absolute pressure) and discharge pressure (absolute pressure) are obtained with Equation 14.

Suction Pressure (kPaG)=Evaporator Pressure (kPaG)−Calculated Suction Pressure Drop (kPa)  (Equation 17)

Discharge Pressure (kPaG)=Condenser Pressure (kPaG)+Calculated Discharge Pressure Drop (kPa)  (Equation 18)

Figure 6:
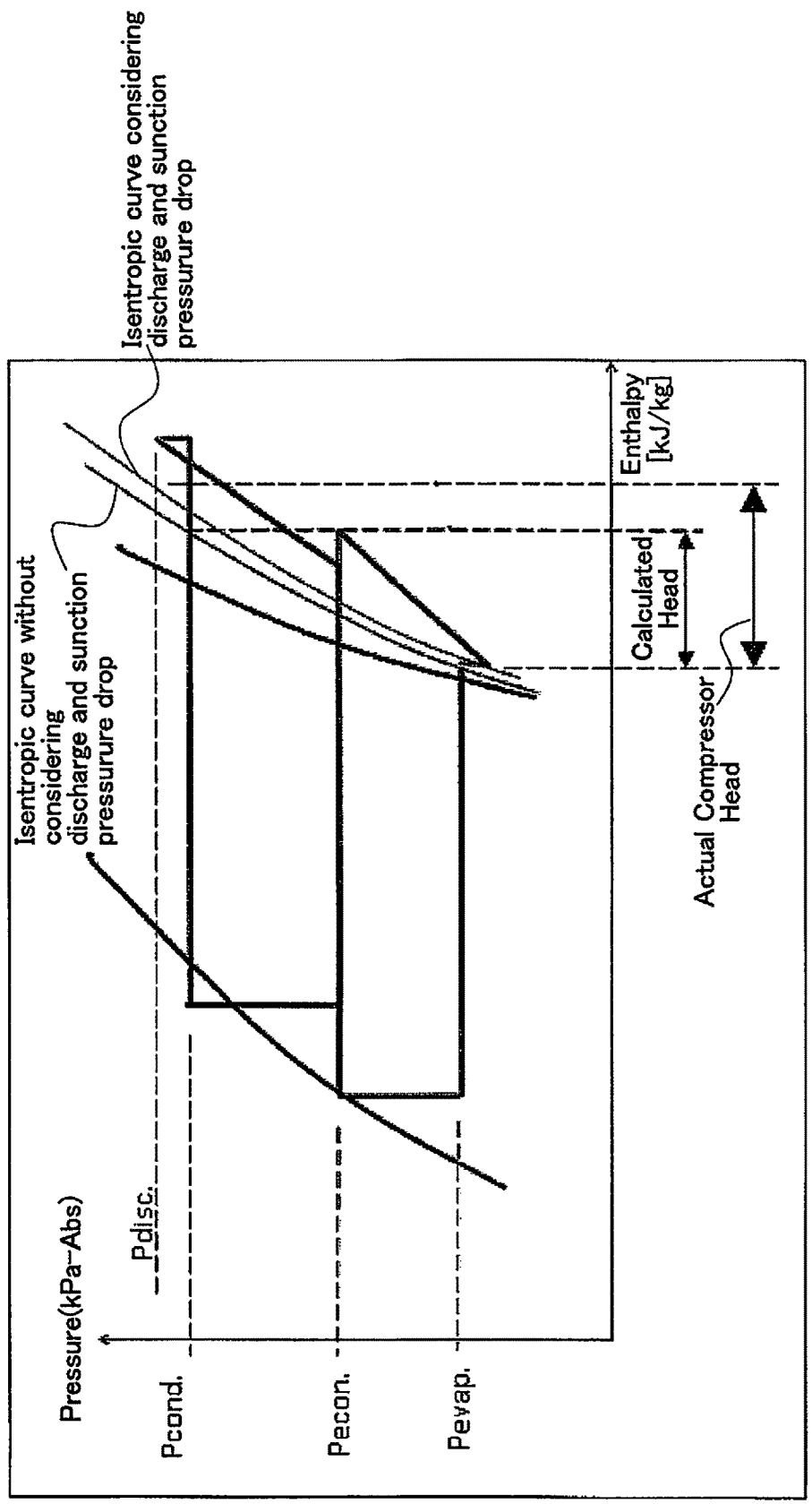
FIG. 6 illustrates head considering the pipe pressure loss and head without considering the pipe pressure loss.

The reason why the suction pressure and the discharge pressure are calculated with above Equations is described below with reference to FIG. 6.

Usually, pressure sensors are often installed at the condenser 24 and the evaporator 28 as shown in FIGS. 1A to 1C in order to protect heat transfer tubes in the condenser and the evaporator (to prevent heat transfer tubes from freezing and protect heat transfer tubes from high/low pressure). When the head calculation is performed based on the detected (reading) value of these pressure sensors, the calculated head is different from the actual compressor head because the discharge/suction pipe pressure drop (loss) is not considered. Therefore, the compressor performance can not be properly monitored.

If the positions of the pressure sensors are moved from condenser 24 and evaporator 28 to compressor discharge and compressor intake respectively, the head can be properly calculated. However, there is a risk that the condenser 24 and the evaporator 28 are not properly protected because the pressures therein are not directly measured.

Pressure sensors can be installed at all of the condenser 24, the compressor discharge, the evaporator 28 and the compressor intake, but the cost will be increased due to increase in the number of sensors. Moreover, the processing speed needs to be increased due to increase in the number of analog inputs into the chiller controller 20.

In order to make up for the above disadvantages, the discharge pressure drop (loss) and the suction pressure drop (loss) are calculated within the chiller controller 20 in Step S404C and the discharge pressure and the suction pressure of the compressor are calculated in Step S405. Since the head is calculated based on these calculations, calculated head is approximated toward the actual value.

In Step S406, a suction temperature reading is obtained from the temperature sensor attached to the suction pipe of the compressor.

In Step S407, a suction superheat (SSH) is calculated with the suction pressure (absolute pressure) calculated in Step S405 and the suction temperature obtained in Step S406.

The suction super heat (SSH) is calculated with Equation 19. Saturated suction temperature in Step S19 is calculated with Equation 20. Ps in Equation 20 is the suction pressure (absolute pressure) calculated in Step S405. Symbols a1 to a4 in Equation 20 represent predetermined coefficients depending on the properties of the refrigerant.

SSH (degC)=Suction Temperature (degC)−Saturated Suction Temperature (degC)  (Equation 19)

Saturated Temperature (degC)=$a1*(\ln(Ps))^3+a2*(\ln(Ps))^2+a3*\ln(Ps)+a4$  (Equation 20)

In Step S408, a suction gas enthalpy is calculated. The suction gas enthalpy is calculated with Equation 21. Gas enthalpy at saturated status in Equation 21 is calculated with Equation 22. Gas enthalpy multiplier for general superheat status in Equation 21 is calculated with Equation 23. Symbols a16 to a21 in Equation 22 and symbols a22 to a33 in Equation 23 represent predetermined coefficients depending on the properties of the refrigerant. Ps in Equations 22 and 23 is suction pressure (absolute pressure) calculated in Step S405. SSH in Equation 23 is suction superheat calculated in Step S407.

$$\text{Suction Gas Enthalpy (kg/kg)} = \text{Gas Enthalpy at Saturated Status} * \text{Gas Enthalpy Multiplier for General Superheat Status}$$  (Equation 21)

$$\text{Gas Enthalpy at Saturated Status} = a16*(Ps^{0.5})^5 + a17*(Ps^{0.5})^4 + a18*(Ps^{0.5})^3 + a19*(Ps^{0.5})^2 + a20*Ps^{0.5} + a21$$  (Equation 22)

$$\text{Gas Enthalpy Multiplier for General Superheat Status} = 1 + (a22*SSH^4 + a23*SSH^3 + a24*SSH^2 + a25*SSH)* \\ (Ps^{0.5})^2 + \left(\begin{array}{c} a26*SSH^4 + a27*SSH^3 + \\ a28*SSH^2 + a29*SSH \end{array}\right)*Ps^{0.5} + \\ (a30*SSH^4 + a31*SSH^3 + a32*SSH^2 + a33*SSH)$$  (Equation 23)

In Step S409, an isentropic discharge enthalpy is calculated. The isentropic discharge enthalpy is calculated with Equation 24. Isentropic discharge enthalpy when the suction superheat is 0 in Equation 24 is calculated with Equation 25. Isentropic discharge enthalpy multiplier 1 in Equation 24 is calculated with Equation 26. Isentropic discharge enthalpy multiplier 2 in Equation 24 is calculated with Equation 27. Symbols a55 to a74 in Equation 25, symbols a75 to a86 in Equation 26, and symbols a87 to a89 in Equation 27 represent predetermined coefficients depending on the properties of the refrigerant. Pd in Equations 25 and 26 is the discharge pressure (absolute pressure) calculated in Step S405. Ps in Equations 25 and 27 is the suction pressure (absolute pressure) calculated in Step S405. SSH in Equation 26 is the suction superheat calculated in Step S407.

$$\text{Isentropic Discharge Enthalpy } (kJ/kg) = \\ \text{Isentropic Discharge Enthalpy when} \\ \text{the Suction Superheat is 0} * \text{Isentropic} \\ \text{Discharge Enthalpy Multiplier 1} * \\ \text{Isentropic Discharge Enthalpy Multiplier 2}$$  (Equation 24)

Isentropic Discharge Enthalpy when the Suction Superheat is 0 = (Equation 25)

$$\{a55*(Pd^{0.5})^4 + a56*(Pd^{0.5})^3 + a57*(Pd^{0.5})^2 + a58*(Pd^{0.5}) + a59\} *$$
$$(Ps^{0.5})^3 +$$
$$\{a60*(Pd^{0.5})^4 + a61*(Pd^{0.5})^3 + a62*(Pd^{0.5})^2 + a63*(Pd^{0.5}) + a64\} * (Ps^{0.5})^2 +$$
$$\{a65*(Pd^{0.5})^4 + a66*(Pd^{0.5})^3 + a67*(Pd^{0.5})^2 + a68*(Pd^{0.5}) + a69\} *$$
$$(Ps^{0.5}) + a70*(Pd^{0.5})^4 + a71*(Pd^{0.5})^3 + a72*(Pd^{0.5})^2 + a73*(Pd^{0.5}) + a74 + 400$$

Isentropic Discharge Enthalpy Multiplier 1 = (Equation 26)
$$(a75*SSH^2 + a76*SSH + a77)*Pd^3 +$$
$$(a78*SSH^2 + a79*SSH + a80)*Pd^2 +$$
$$(a81*SSH^2 + a82*SSH + a83)*Pd +$$
$$a84*SSH^2 + a85*SSH + a86$$

Isentropic Discharge Enthalpy Multiplier 2 = (Equation 27)
$$a87*Ps^2 + a88*PS + a89$$

In Step S410, the chiller head (isentropic head) is obtained. The chiller head is calculated with Equation 28 using the suction gas enthalpy calculated in Step S408 and the isentropic discharge enthalpy calculated in Step S409.

Chiller Head (kJ/kg)=Discharge Isentropic Enthalpy−Suction Gas Enthalpy  (Equation 28)

The suction temperature is taken into account in above calculation for the chiller head (isentropic head). Tables 3 to 5 show an example of the difference between when the suction temperature is taken into consideration in head calculation and when it is not. The influence of the suction temperature to the head calculation becomes larger under the relatively high suction temperature operation condition such as hot gas combined operation. Accuracy of the head calculation is improved by including the suction temperature in head calculation.

TABLE 3

Case 1: Head calculated without considering the influence of suction temperature SSH = Suction Temperature − Saturated Suction Temperature = 0 (deg C.)

| Suction Pressure | Discharge Pressure (kPaA) | | | | | | |
|---|---|---|---|---|---|---|---|
| (kPaA) | 600 | 700 | 800 | 900 | 1000 | 1100 | 1200 |
| 200 | 23.85 | 27.30 | 30.29 | 32.94 | 35.30 | 37.45 | 39.40 |
| 300 | 14.26 | 17.48 | 20.27 | 22.73 | 24.93 | 26.92 | 28.72 |
| 400 | 7.84 | 10.88 | 13.52 | 15.83 | 17.90 | 19.77 | 21.46 |
| 500 | 2.95 | 5.84 | 8.34 | 10.54 | 12.49 | 14.25 | 15.84 |

TABLE 4

Case 2: Head calculated considering the influence of suction temperature SSH = Suction Temperature − Saturated Suction Temperature = 10 (deg C.)

| Suction Pressure | Discharge Pressure (kPaA) | | | | | | |
|---|---|---|---|---|---|---|---|
| (kPaA) | 600 | 700 | 800 | 900 | 1000 | 1100 | 1200 |
| 200 | 24.96 | 28.57 | 31.72 | 34.50 | 36.99 | 39.25 | 41.31 |
| 300 | 15.02 | 18.42 | 21.37 | 23.98 | 26.31 | 28.42 | 30.34 |
| 400 | 8.42 | 11.64 | 14.44 | 16.91 | 19.12 | 21.11 | 22.92 |
| 500 | 3.58 | 6.67 | 9.34 | 11.70 | 13.80 | 15.69 | 17.41 |

TABLE 5

Difference of the head between when the suction temperature is taken into consideration in head calculation and when it is not

| Suction Pressure | Discharge Pressure (kPaA) | | | | | | |
|---|---|---|---|---|---|---|---|
| (kPaA) | 600 | 700 | 800 | 900 | 1000 | 1100 | 1200 |
| 200 | 1.11 | 1.28 | 1.43 | 1.56 | 1.69 | 1.80 | 1.91 |
| 300 | 0.76 | 0.94 | 1.10 | 1.24 | 1.38 | 1.50 | 1.62 |
| 400 | 0.58 | 0.76 | 0.93 | 1.08 | 1.21 | 1.34 | 1.46 |
| 500 | 0.63 | 0.83 | 1.00 | 1.16 | 1.31 | 1.44 | 1.57 |

Figure 7:
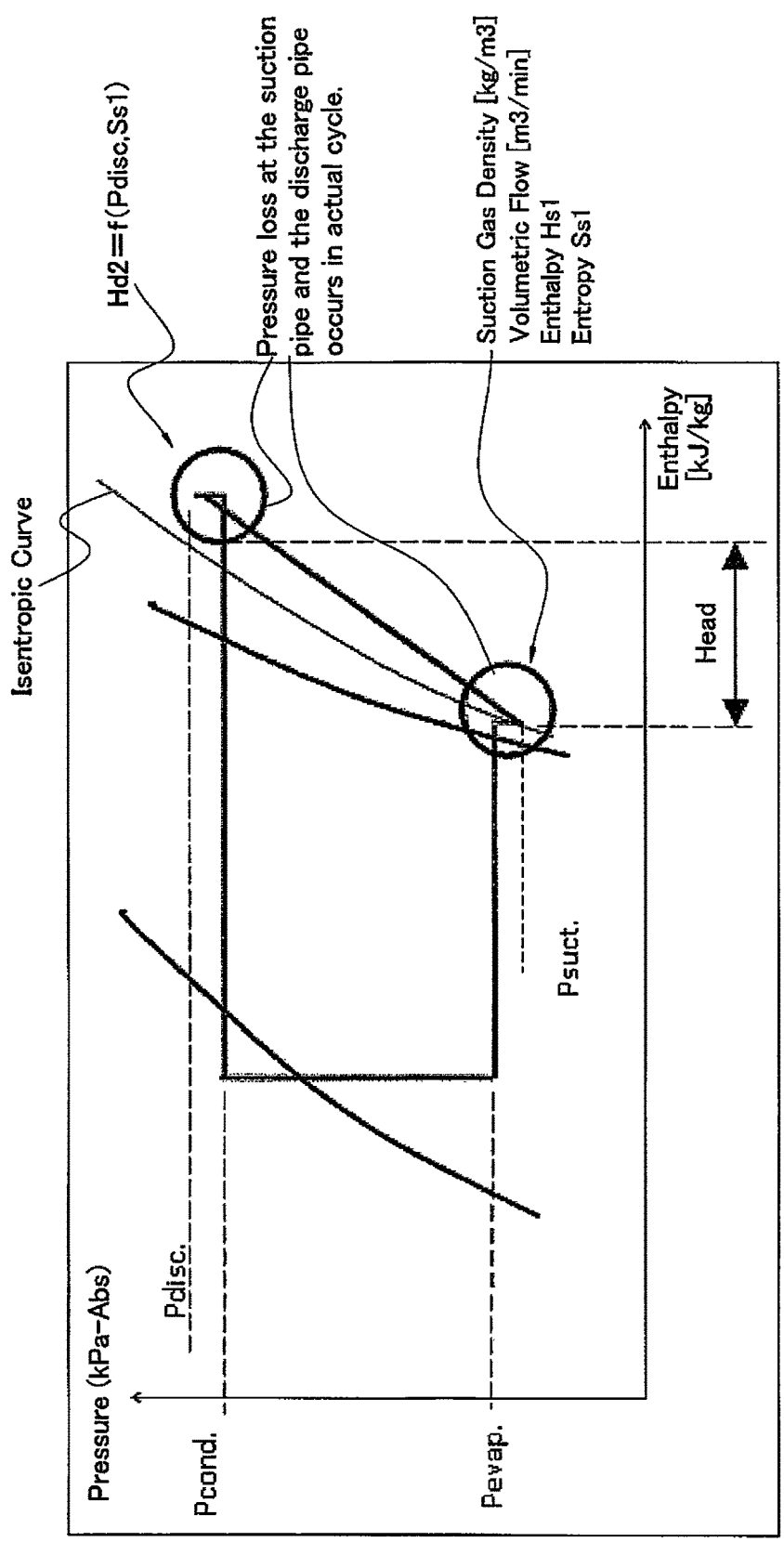
FIG. 7 illustrates head (single stage)
Figure 8:
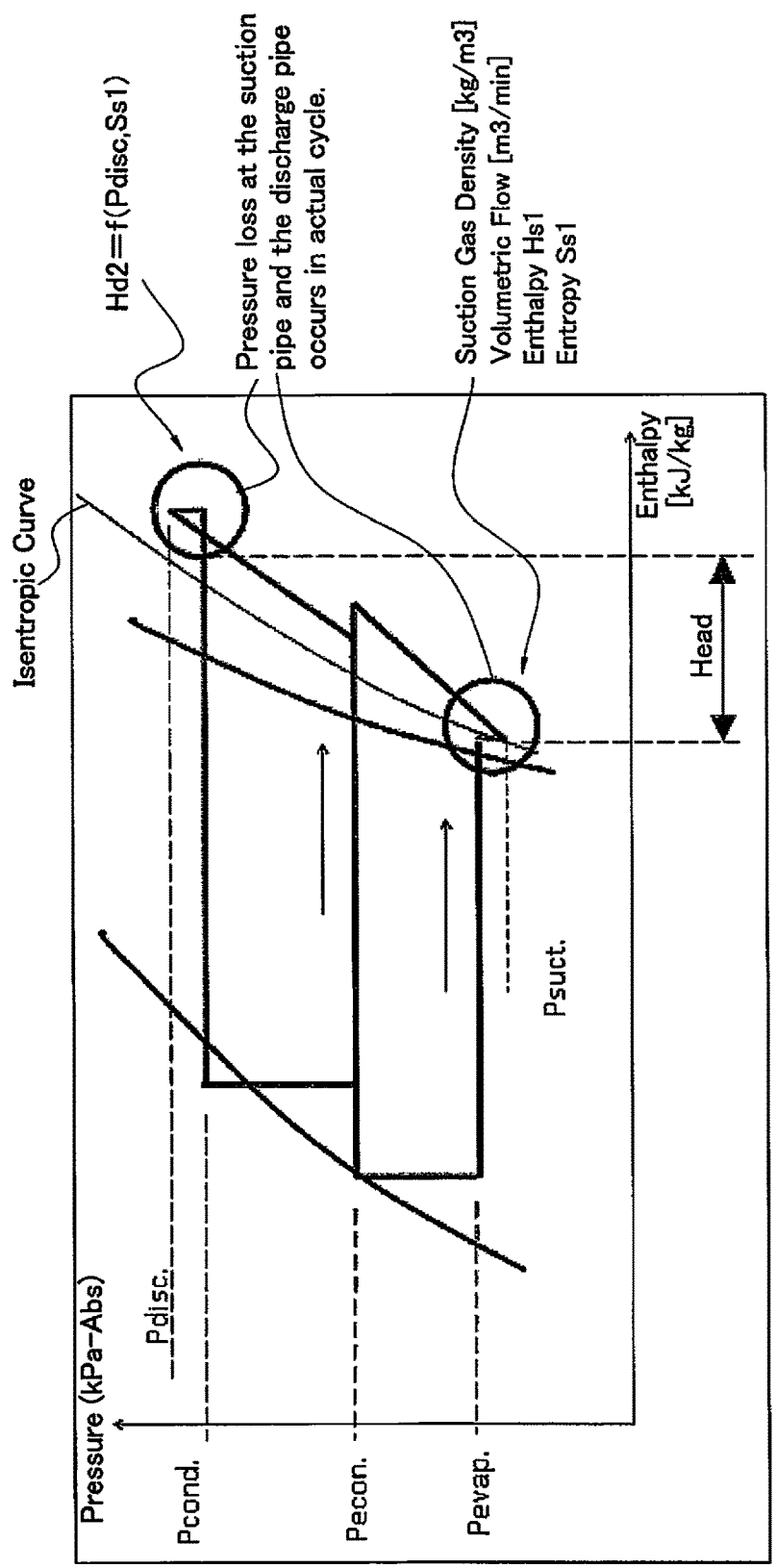
FIG. 8 illustrates head (pseudo single stage basis)—two stage cycle.

The centrifugal compressor 22 of Chiller 10 and 110 is a two-stage compressor, but the isentropic head is expressed in a pseudo single stage enthalpy basis. In FIGS. 7 and 8, P-h diagrams when the compressor is single stage (when the centrifugal compressor 222 of chiller 210 is used) and when the compressor is two-stage (when the centrifugal compressor 22 of chiller 10 and chiller 110 is used) are shown.

When the single-stage compressor (centrifugal compressor 222) is used, the isentropic head (kJ/kg) is calculated by subtracting HS1 from Hd2 (refer to FIG. 7)

When two-stage compressor (centrifugal compressor 22) is used, there are two intakes, $1^{st}$ stage intake for $1^{st}$ (low stage) compression mechanism 42a and $2^{nd}$ stage intake for $2^{nd}$ (high stage) compression mechanism 42b. Also, the compression part (compression mechanism) is divided into two stages. Therefore, the head calculation needs to be performed for each of $1^{st}$ stage and $2^{nd}$ stage in theory. But, when the head calculation is performed for each stage, the calculation becomes complicated. Also, gas of the economizer 30, which is sucked by the $2^{nd}$ stage side, bypasses the evaporator 28, and thus, it does not directly contribute to generation of chilled water, which is the purpose of the chiller, since the heat is exchanged at the evaporator 28. Therefore, it is difficult to associate the calculation of the $2^{nd}$ stage compression with the real time load.

Accordingly, although two-stage compression is conducted, the calculation focuses only on the $1^{st}$ stage intake (intake for $1^{st}$ (low stage) compression mechanism 42a) and the final stage discharge (discharge of $2^{nd}$ (high stage) compression mechanism 42b), and it is calculated as a pseudo "single stage compressor". In other words, the isentropic head (kJ/kg) is calculated by subtracting Hs1 from Hd2 (refer to FIG. 8).

Also, the head property and the compressor capacity property are treated as pseudo single stage. In other words, the gas of the economizer 30 is not included in the calculation intentionally. Therefore the entire intake gas to the centrifugal compressor 22 passes the evaporator 28, and it becomes easy to balance calculate the compressor load (gas flow property) and the evaporator load (chilled water load).

As shown in the flowchart of FIG. 4, the suction pressure and the discharge pressure are converted into absolute pressure according to the height of the location where the chiller is installed. The height of the location is a setting set in the chiller controller 20.

As shown in the flowchart of FIG. 4, the suction pressure is obtained by applying correction to a reading of the pressure sensor attached to the evaporator with the amount of pressure loss (pressure drop) in the suction pipe calculated at any time on the basis of the gas flow of the compressor. Also, the discharge pressure is obtained by applying correction to a reading of the pressure sensor attached to the condenser with the amount of pressure loss (pressure drop) in the discharge pipe calculated at any time on the basis of the gas flow of the compressor.

The chiller controller 20 determines a surge abnormality and stops the compressor when an integrated time in which the isentropic head surpasses the surge curve exceeds a preset time in a most recent fixed time period.

Figure 9:
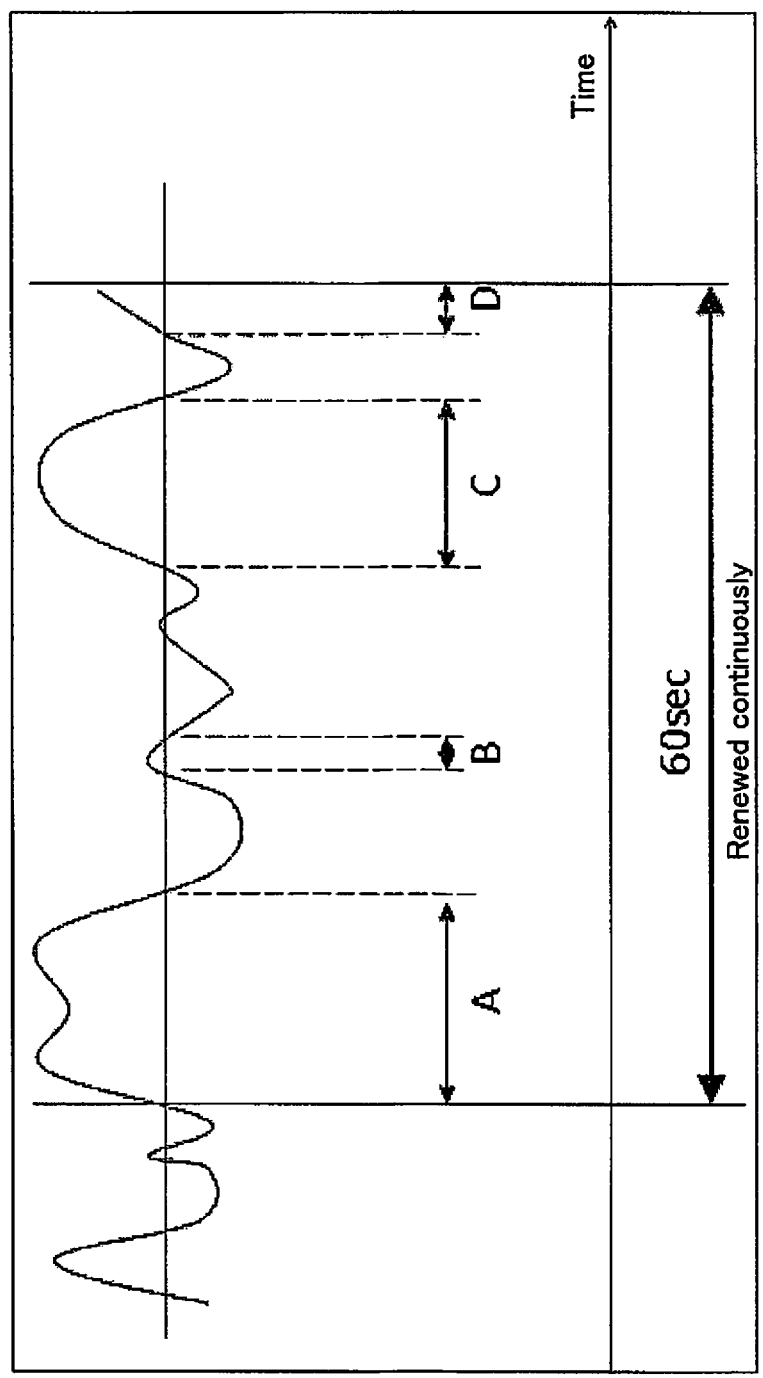
FIG. 9 illustrates surge detection method.

FIG. 9 shows a surge detection method by the chiller controller 20. When the sum of time (sum of A, B, C and D in FIG. 9) in which the chiller head is larger than the surge head exceeds threshold (e.g. 10 sec) in last 60 sec, surge is detected and the compressor is stopped rapidly.

Figure 10:
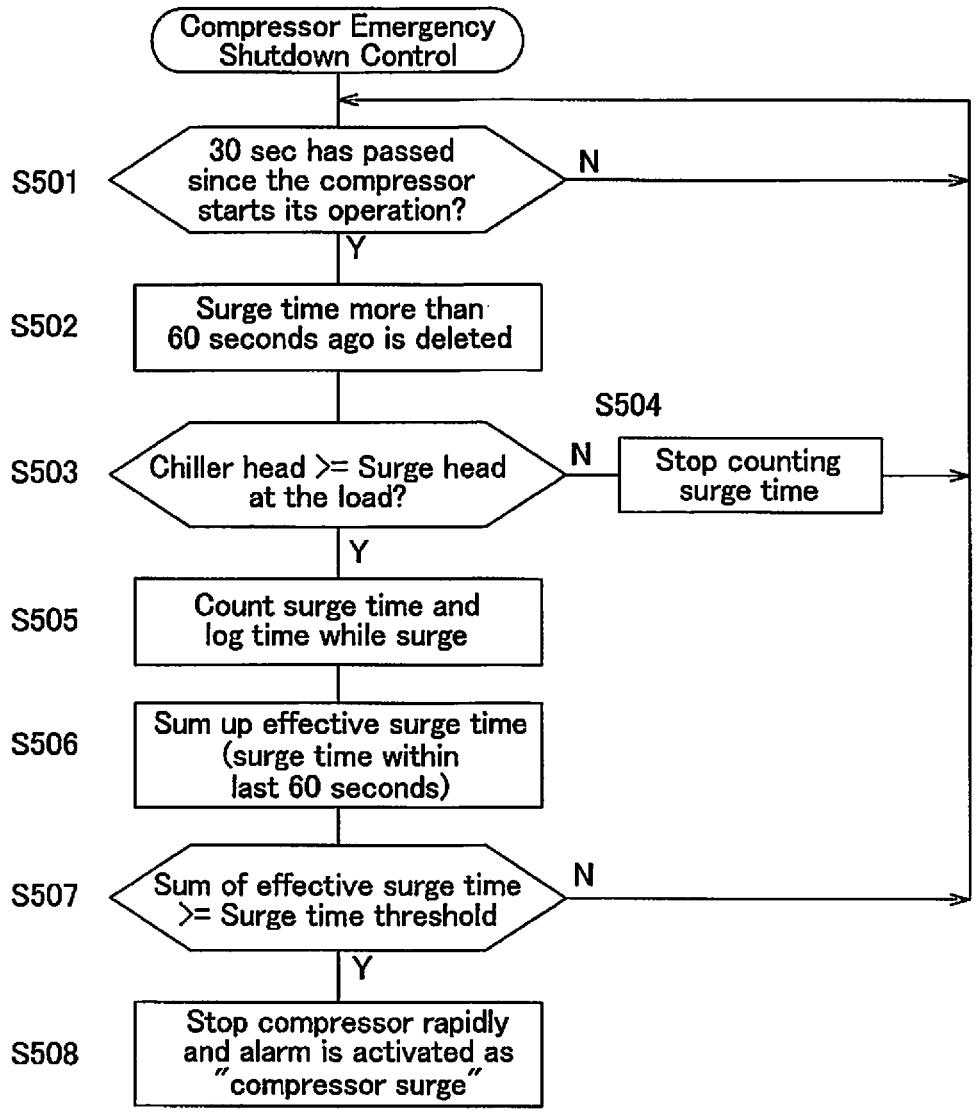
FIG. 10 illustrates a flowchart for compressor emergency shutdown control according to one embodiment.

FIG. 10 shows an example of the flowchart of the compressor emergency shutdown control according to one embodiment.

In Step S501, it is determined whether it has passed thirty seconds since the compressor starts its operation. Step S501 is repeated until it is determined that it has passed thirty seconds since the compressor starts its operation.

In Step S502, surge time more than 60 seconds ago is deleted.

In Step S503, it is determined whether the chiller head is equal to or larger than the surge head or not. When it is determined that the chiller head is not equal to or larger than the surge head (surge head is smaller than the surge head) in Step S503, it proceeds to Step S504. When it is determined that the chiller head is equal to or larger than the surge head in Step S503, it proceeds to Step S505.

In Step S504, counting of the surge time is stopped. Then it returns to Step S501.

In Step S505, the surge time and the log time is counted while surge. Then it proceeds to Step S506.

In Step S506, effective surge time (surge time detected within last 60 seconds) is summed up. Then it proceeds to Step S507.

In Step S507, it is determined whether the sum of the effective surge time is equal to or larger than the surge time threshold (e.g. 10 sec). When it is determined that the sum of the effective surge time is not equal to or larger than the surge time threshold (smaller than the surge time threshold), it returns to Step S501. On the other hand, when it is determined that the sum of the effective surge time is equal to or larger than the surge time threshold, the compressor is stopped in Step S508 and alarm is activated as "compressor surge".

ADDITIONAL EXPLANATIONS/ADVANTAGES

The present disclosure relates to an operating condition (head) detection method, a surge avoiding control, and a surge detection control for realizing a high efficiency operation in a turbo chiller.

In a turbo chiller, operating at as low a rotational frequency as possible corresponding to the operating conditions at each occasion while giving consideration to the surge characteristics particular to the compressor is the key to enhancing the efficiency.

Also, if it is possible to get a grasp of the current operating conditions by a controller with favorable accuracy in conformity with the actual conditions, the calculated margin between the current surge point of the compressor and the operating head will be highly accurate, and an operation with favorable efficiency can be achieved.

As a method for getting a grasp of the current operating conditions, a method that uses a compressor characteristic map expressed with dimensionless capability index and pressure coefficient is disclosed, for example, in U.S. Pat. No. 5,355,691. This method enables getting a grasp of the operating conditions with an effective accuracy as a general expression when the aero parts of the compressor are proportionally designed. However, since optimal efficiency in a wide range, including the partial load area, is required lately, minor improvements are suitably added to each compressor according to the operating conditions (capability, head, or the like) even when the aero parts are originally designed proportionally. In such case, the compressor characteristic map that uses a dimensionless expression as the general expression does not always indicate the true characteristic of each compressor, and there is a limitation in an efficiency optimizing control with this map.

A capacity control method that uses a compressor characteristic map is introduced in US2011/0093133. According to this method, a condenser and an evaporator (or the differential pressure of high pressure and low pressure) are used in addition to a rotational frequency and an opening degree of the capacity control mechanism to detect the operating conditions. However, the surge characteristics are influenced by the condition of the suction temperature not only by the condition of the pressure. Therefore, the calculated margin between the head and the surge head obtained from the calculation results at a time of operation when a hot gas bypass is used, during which the suction temperature elevates greatly compared to at a time of normal operation, degrades in accuracy as compared to the calculated margin when a hot gas bypass is not used. This negatively affects the chiller efficiency and the operating range.

Also, installing a plurality of pressure sensors on the high-pressure side and the low-pressure side is rare in a turbo chiller from viewpoints of limitations of the number of input/output points of the controller and cost reduction. Therefore, the pressure sensors are often installed in each condenser and evaporator to also protect heat exchanger tubes in the heat exchanger from freezing. In this case, there is a discharge piping or a suction piping between the discharge or suction position of the compressor and the position where the pressure sensor is installed. Whereas a pressure loss corresponding to the gas flow of the compressor is always generated in the discharge piping and the suction piping, the surge head of the compressor depends on the pressure of the inlet port and the discharge port of the compressor. Therefore, it is not possible to grasp the surge margin in the compressor with favorable accuracy during an operation unless the pressure loss generated in the piping is suitably treated.

Furthermore, when consideration is given to the cost and procurability, a gauge pressure sensor is generally used as the pressure sensor, which is used together with the controller to get a grasp of the operating conditions. Whereas the readings of the gauge pressure sensor are affected by the atmospheric pressure, the chiller coolant system is a closed system that is completely shut off from the outside. Therefore, due to the location where the chiller is installed, in particular, when the chiller is installed on high altitude place, the effect of the atmospheric pressure on the pressure sensor varies even in the same chiller. As a result, a phenomenon can be supposed wherein the setting for the optimal operation of the compressor tested and verified at the plant may not always be optimal for operation after the product is delivered to the destination and installed.

For detecting the surge condition, there are a method of detecting the pressure pulsation of the diffuser on the discharge side as disclosed in, for example, U.S. Pat. No. 6,036,432, a method of detecting the changes in the motor current and the discharge-inlet differential pressure of the compressor as disclosed in U.S. Pat. No. 5,894,736, or the like. However, when it is operated with a head that has a sufficiently low rotational frequency in a compressor; the pressure change and the current change are minimal. Therefore, it is difficult to discriminate the surge from a normal condition and detect the surge correctly.

As disclosed in US2011/0093133, there is one that revises the existing surge surface by detecting the actual surge. The surge surface means a three-dimensional curved surface which is formed by plotting surging points (surge head) of the compressor by using the rotational frequency of the compressor and the opening degree of the IGV as parameters. However, if the accuracy in the surge detection by sensing the pressure or the current degrades due to the reason provided above at a time of partial load, there is a possibility that revising the surge in this method may rather narrow down the operating range of the compressor.

Also, in the conventional methods described above, the suction temperature is not used in the surge detection. However, when a hot gas bypass is used, the inlet gas temperature becomes higher in comparison to a normal state; this will considerably affect the operating head, and it is possible that accuracy in the surge detection is deteriorated when the hot gas bypass is used and the surge head is revised with the method which does not include the suction temperature in the head calculation.

The problem is to provide a chiller wherein an efficient operation during a normal time and the surge detection functions of high accuracy during an emergency time are made to coexist regardless of the size of the load or the presence of a hot gas bypass.

To solve the problem described above, the centrifugal refrigeration system in this disclosure is bestowed with a surge curve in dimensional units on the premise that surge characteristics particular to each compressor are provided separately. Also, the head calculation is carried out with favorable accuracy in a condition where the suction gas temperature greatly exceeds the normal temperature when a hot gas bypass is used or the like, since the suction gas temperature is monitored in addition to the suction pressure and the discharge pressure.

Also, the surge characteristics are handled as isentropic enthalpy, rather than as a pressure difference and a compression ratio. Especially, in the case of a two-stage centrifugal compressor, the gas intake volume from the economizer varies according to the current rotational frequency (actual rotational speed of the compressor), the opening degree of the suction capacity control mechanism, the opening degree of the discharge capacity control mechanism, or the subcooling condition of the liquid at the outlet of the condenser. Therefore, logically, an evaluation of the compression condition is necessary for both the $1^{st}$ stage side and the $2^{nd}$ stage side. However, one of the characteristics of the present disclosure is that the head is expressed, for simplicity, by a pseudo single stage based isentropic enthalpy which is calculated from the $1^{st}$ stage side suction pressure, the $1^{st}$ stage side suction temperature, and the $2^{nd}$ stage side discharge pressure.

Also, the correction with the atmospheric pressure is carried out specifically by using the height of the location where the chiller is installed as parameter. The calculation of the head is handled by absolute pressure basis by adding the atmospheric pressure calculated by using the height of the location where the chiller is installed as parameter to the readings of the gauge pressure sensor.

Therefore, reproducing the operating condition originally intended in the design is enabled regardless of the location where the chiller is installed.

Further, the designed discharge piping pressure loss and the suction piping pressure loss when operated specifically at the rating compressor gas flow (the rating compressor volumetric flow) are provided as the settings. The discharge and suction piping pressure losses at the current operating conditions are calculated with the square of the current compressor gas flow ratio (pipe velocity ratio) and used in the isentropic head calculation. As a result the calculation of the isentropic head which becomes a standard for evaluating the head of the compressor can be calculated in the compressor inlet port and outlet port basis.

Further, the operating head which is monitored and calculated with a controller is regularly compared with the surge curve of the compressor preset in the controller and verified to enable accurate surge detection at the partial load. Generally, the operating head does not continuously exceed the surge curve normally even if a surge condition is generated, and more often than not, the operating head fluctuates around the border of the surge curve at a high frequency. In the present disclosure, to surely detect a surge phenomenon by determining whether the fluctuation of the operating head is a surge phenomenon or a transient state, the integrated value of the time whereat the operating head exceeds the surge curve is used as a reference for making the determination. The integrated value is automatically updated as a value within the last one minute. When this value exceeds the preset threshold value, a surge condition is determined, and the compressor is automatically stopped immediately.

Essentially, the surge characteristics have a curve particular to each compressor with the rotational frequency (the rotational speed) or the opening degrees of the suction and discharge capacity control mechanisms as parameters. Therefore, if both the surge characteristics and the operating head can be expressed with a high degree of accuracy, a determination of the surge condition is made highly reliable as compared to the other methods that are based on sensing. What is important is to closely define the surge characteristics separately for each compressor and to enhance the calculation accuracy of the operating head, and the point to note is that the surge detection of the above is made possible by applying a portion or all of the contents in this disclosure. Also, since the suction (inlet) gas temperature is included in calculating the operating head, a determination of surge according to the present method can be applied even when a hot gas bypass is used, and accurate surge detection is made possible.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A refrigerating apparatus comprising:
   a centrifugal compressor;
   a suction capacity control mechanism and a discharge capacity control mechanism configured to control a capacity of the compressor by changing opening degrees of the suction capacity control mechanism and the discharge capacity control mechanism; and
   a controller configured to compare a compressor-specific surge curve with an isentropic head to perform
      rotational speed control of the compressor,
      rotational speed adjustment control of the compressor in order to avoid surge, and
      emergency shutdown control of the compressor upon detection of surge,
   the controller being configured to determine a surge abnormality and perform the emergency shutdown control to stop the compressor when a sum of time in which the isentropic head surpasses the compressor-specific surge curve exceeds a preset time in a most recent fixed time period,
   the compressor-specific surge curve being stored in the controller, and the compressor-specific surge curve being defined by an actual rotational speed of the compressor, the opening degree of the suction capacity control mechanism, and the opening degree of the discharge capacity control mechanism, and
   the isentropic head being calculated based on a suction pressure, a discharge pressure, and a suction superheat during operation,
   the suction superheat being based on a suction temperature during operation.

2. The refrigerating apparatus according to claim 1, wherein
   the compressor is a two stage compressor, and
   the isentropic head is expressed in a pseudo single stage enthalpy basis.

3. The refrigerating apparatus according to claim 1, further comprising
   a condenser pressure sensor attached to a condenser of the refrigerating apparatus; and
   an evaporator pressure sensor attached to an evaporator of the refrigerating apparatus,
   the suction pressure and the discharge pressure being obtained respectively by applying correction to a reading of the evaporator pressure sensor and a reading of the condenser pressure sensor by an amount of pressure loss in a suction pipe and a discharge pipe calculated at any time based on a gas flow of the compressor.

4. The refrigerating apparatus according to claim 1, wherein
   the suction pressure and the discharge pressure are converted into absolute pressure according to an altitude of a location where the refrigerating apparatus is installed, the altitude of the location being selectable as a setting in the controller.

* * * * *